(12) United States Patent
Padilla

(10) Patent No.: US 12,474,416 B2
(45) Date of Patent: Nov. 18, 2025

(54) INTERNET OF THINGS (IoT) APPLICATION FOR CABLE ANALYSIS

(71) Applicant: Knowix, LLC, Houston, TX (US)

(72) Inventor: Luis Padilla, Katy, TX (US)

(73) Assignee: Knowix, LLC, Houston, TX (US)

( * ) Notice: Subject to any disclaimer, the term of this patent is extended or adjusted under 35 U.S.C. 154(b) by 203 days.

(21) Appl. No.: 18/424,012

(22) Filed: Jan. 26, 2024

(65) Prior Publication Data

US 2024/0255586 A1 Aug. 1, 2024

Related U.S. Application Data

(63) Continuation of application No. PCT/US2023/061498, filed on Jan. 27, 2023.

(51) Int. Cl.
*G01R 31/58* (2020.01)
*G01R 31/08* (2020.01)

(52) U.S. Cl.
CPC ........... *G01R 31/58* (2020.01); *G01R 31/088* (2013.01)

(58) Field of Classification Search
USPC ........................................................ 324/539
See application file for complete search history.

(56) References Cited

U.S. PATENT DOCUMENTS

2015/0197408 A1\* 7/2015 St. Germain .......... D07B 1/148
340/668

FOREIGN PATENT DOCUMENTS

CA 3127876 A1 7/2020
WO 2022048804 A1 3/2022

OTHER PUBLICATIONS

International Search Report and Written Opinion mailed on Aug. 11, 2023 in International Patent Application No. PCT/US2023/061498, 12 pages.
Oland, E., et al. "Condition Monitoring Technologies for Synthetic Fiber Ropes—a Review", International Journal of Prognostics and Health Management, vol. 8 No. 2 (2017), pp. 1-14, https://doi.org/10.36001/ijphm.2017.v8i2.2619.

\* cited by examiner

*Primary Examiner* — Farhana A Hoque
(74) *Attorney, Agent, or Firm* — Matthew Frontz; Polsinelli PC

(57) ABSTRACT

Disclosed herein are systems, methods, and computer-readable media for cable analysis and monitoring systems. In one aspect, the method includes obtaining from a plurality of sensors sensor data that includes a plurality of sensor measurements associated with a cable. In one aspect, the method includes storing the sensor data in a database. Each respective sensor measurement of the plurality of sensor measurements is associated with a group identifier included in a set of group identifiers. In one aspect, the method includes retrieving for each selected type of one or more selected types of sensor measurements, a set of time series sensor measurements of the selected type. In one aspect, the method includes determining based on the sets of time series sensor measurements one or more warning events associated with the cable. In one aspect, the method includes automatically generating one or more remediation actions for remediating the warning event.

20 Claims, 14 Drawing Sheets

INTERNET OF THINGS (IoT) APPLICATION FOR CABLE ANALYSIS

CROSS REFERENCE TO RELATED APPLICATIONS

This application is a continuation of Application No. PCT/US2023/061498, filed Jan. 27, 2023, the entire contents which is incorporated herein by reference.

TECHNICAL FIELD

The subject matter of this disclosure generally relates to the field of line management and more particularly, relates to the management of cables in a cable system through the monitoring of scheduled maintenance and environmental factors.

BACKGROUND

Cable systems form a long-span structure between two objects subject to tensions typically used for pulling, fastening, attaching, carrying, lifting, and climbing. More specifically, cable systems are often used to transport or move weight or materials between two or more objects. Cables are often flexible structures that support the applied transverse loads by the tensile resistance developed in their members. Cables are used in suspension bridges, tension leg offshore platforms, transmission lines, and several other engineering applications. In some cases, the term "cable" can be used interchangeably to refer to ropes, cables, and similar members such as lifting slings, roundslings, etc. Cables can be manufactured from various metals such as steel (and various alloys thereof). Cables may also be manufactured from various artificial and/or manmade fibers. For example, cables manufactured from one or more types of synthetic fibers or synthetic filaments can also be referred to as "synthetic cables".

The structural capabilities, environmental factors, and maintenance of the equipment often determine the effectiveness of a cable. Cables, like most equipment, are subject to gradual wear and tear that, with time, result in a more or less rapid loss of initial performance. For example, under normal use conditions of the cable, the characteristics of the cable will change over time. Due to a variety of factors that include the weight of the load the cable is subjected to, tension, or environmental effects, the cable can deteriorate or lose effectiveness in its structural and operational characteristics. A cable that is structurally compromised can create an increase in safety risks and the decrease the longevity of the equipment the cable is associated with.

The need thus exists for systems and methods for analyzing and measuring data related to the cable under normal and high-stress conditions to determine whether the cable is sufficient for continued use in operation or if remedial actions are needed.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 2 illustrates an example dashboard for monitoring the performance of a plurality of cables of one or more cable systems of a cable analysis system, according to aspects of the disclosure.

FIG. 4 illustrates an example interface for assigning a task using alert status indicators, according to aspects of the disclosure.

FIG. 8B illustrates an example reporting module for providing information associated with retired assets of the cable analysis system, according to aspects of the disclosure.

FIG. 10 illustrates a task interface of the cable analysis system, according to aspects of the disclosure.

DETAILED DESCRIPTION

Figure 1:
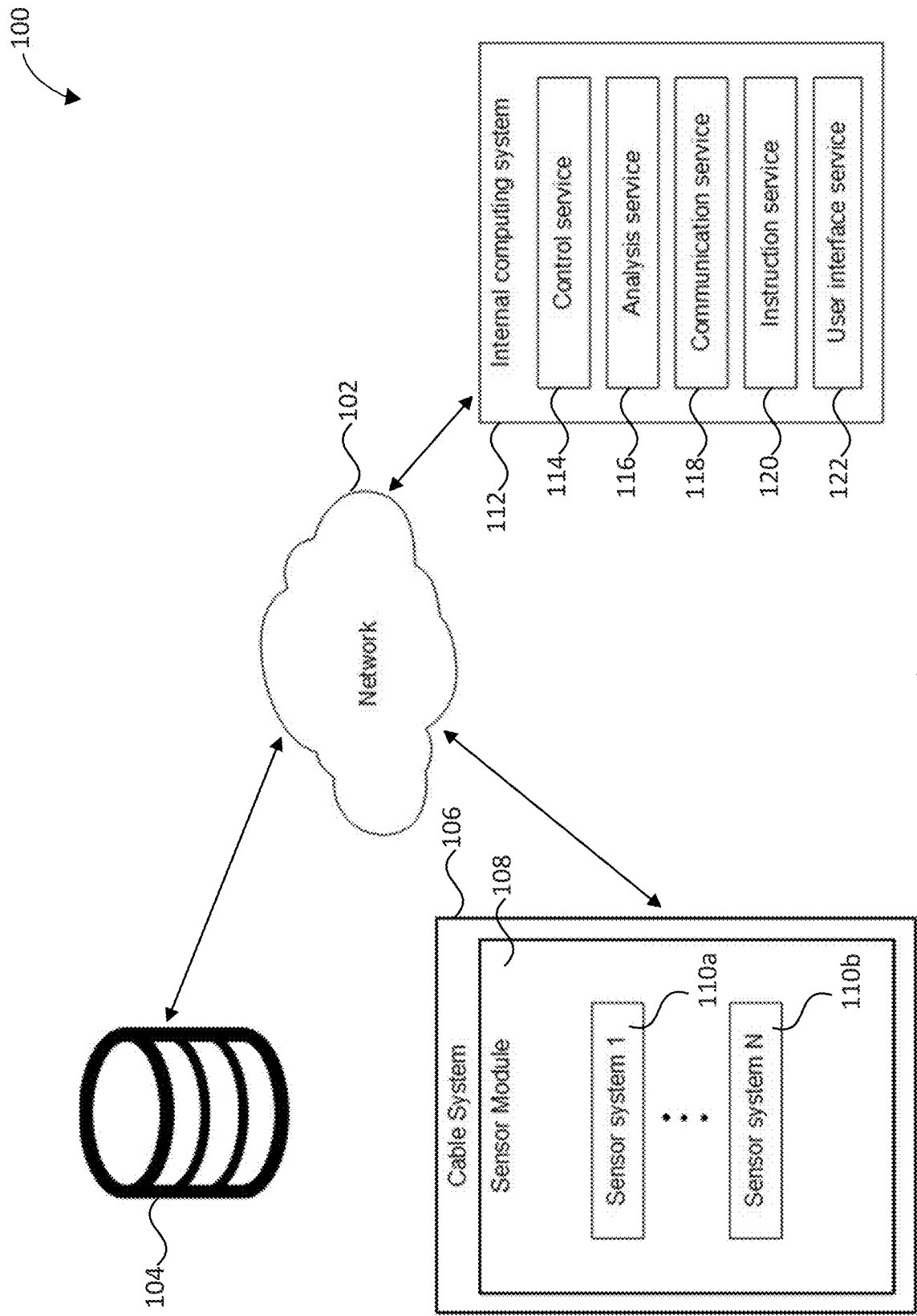
FIG. 1 illustrates an example communication diagram of a cable analysis system, according to aspects of the disclosure.

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions, will control.

Additional features and advantages of the disclosure will be set forth in the description which follows and, in part, will be obvious from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

The present disclosure is directed to a cable system analysis service for analyzing, inspecting, and monitoring cable systems, including a plurality of cables. In some embodiments, the plurality of cables can also include a plurality of ropes. In one illustrative example, the plurality of cables can be synthetic fiber or filament cables (e.g., cables manufactured from one or more synthetic filament materials, comprising multiple strands of wound synthetic filaments, etc.). These include DYNEEMA (ultra-high-molecular weight polyethylene), SPECTRA (ultra-high-molecular weight polyethylene), TECHNORA (processed terephthaloyl chloride), TWARON (para-aramid), KEVLAR (para-aramid), VECTRAN (liquid crystal polymer), PBO (polybenzobisoxazole), carbon fiber, and glass fiber (among many others). Modern cables may also be made of older, lower-strength synthetic materials such as NYLON. In the case of high-strength synthetics, the individual filaments have a thickness that is less than that of human hair. The filaments are very strong in tension, but they are not very rigid. They also tend to have low surface friction. These facts make such synthetic filaments difficult to handle during the process of adding a termination and difficult to organize. Hybrid cable designs are also emerging in which traditional materials are combined with high-strength synthetic materials. Cables made from synthetic filaments have a wide variety of constructions. In many cases a protective jacket will be provided over the exterior of the synthetic filament. This jacket does not carry any significant tensile load, and it may therefore be made of a different material. Most larger cables are made as an organized grouping of smaller cables. The smaller cables are often referred to as "strands." One example is a parallel core of synthetic filaments surrounded by a jacket of braided filaments. In other cases the cable may be braided throughout. In still other examples the cable construction may be: (1) an entirely parallel construction enclosed in a jacket made of different material (2) a helical "twist" construction, (3) a more complex construction of multiple helices, multiple braids, or some combination of helices and braids, or (4) a hybrid construction including metallic constituents.

The cable system analysis services are configured to ingest data received from a plurality of sensors that are in communication with at least one cable (e.g., a synthetic fiber cable), process the data, and make a series of determinations to manage the cable system and the corresponding maintenance schedule. The plurality of sensors can measure a plurality of characteristics of the synthetic fiber cables, such as the tension, temperature, location, time of the collection of data, vibration, and dampening characteristics. In some cases, the systems and techniques described herein with respect to the one or more synthetic fiber cables may also be applied to or otherwise utilized with one or more steel cables, without departing from the scope of the present disclosure.

In one aspect, a method includes obtaining from a plurality of sensors sensor data that includes a plurality of sensor measurements associated with a synthetic fiber cable. In one aspect, the method includes storing the sensor data in a database. Each respective sensor measurement of the plurality of sensor measurements is associated with a group identifier included in a set of group identifiers. In one aspect, the method includes retrieving for each selected type of one or more selected types of sensor measurement, a set of time series sensor measurements of the selected type. Each stored sensor measurement is associated with a different timestamp. In one aspect, the method includes determining, based on the sets of time series sensor measurements one or more warning events associated with the synthetic fiber cable. In one aspect, the method includes automatically generating one or more remediation actions for remediating the warning event.

In another aspect, determining the one or more warning events associated with the synthetic fiber cable includes determining one or more baseline fluctuations associated with one or more of the sets of time series sensor measurements, analyzing a most recent portion of the sets of time series sensor measurements against the one or more determined baseline fluctuations and one or more thresholds, and generating a warning event based on identifying one or more deviations or abnormalities in an analysis of the most recent portion of the sets of time series sensor measurements.

In another aspect, the one or more thresholds comprise pre-determined thresholds determined based on one or user inputs or are determined based on analyzing the sets of time series sensor measurements against one or more corresponding sets of ground truth labeled data.

In another aspect, the method further includes generating a set of ground truth labeled data based on obtaining historical outcome data associated with one or more reference cables, obtaining reference measurements associated with the one or more reference cables, and generating one or more ground truth labels based on correlating a historical outcome of the historical outcome data with one or more features of the reference measurements during model refinement.

In another aspect, the method further includes obtaining, from the plurality of sensors, real-time sensor data that includes a plurality of real-time sensor measurements associated with the synthetic fiber cable, determining based on the sets of time series sensor measurements and the real-time sensor data one or more ongoing warning events associated with the synthetic fiber cable, and automatically generating one or more alerts indicative of the one or more ongoing warning events associated with the synthetic fiber cable.

In another aspect, the one or more selected types of sensor measurements are obtained based on receiving a user selection of a particular cable included in a plurality of cables represented in the database, determining a plurality of available types of sensor measurements corresponding to the stored sensor measurements associated with the particular cable, obtaining the one or more selected types of sensor measurements as a user selection from the plurality of available types of sensor measurements for the particular cable.

In another aspect, the one or more selected types of sensor measurements are determined based on one or more user inputs received to a user interface, and the set of stored sensor measurements of each selected type are retrieved based on correlating each user input to a corresponding group identifier used by the database.

In another aspect, the one or more selected types of sensor measurements are obtained based on an automatically generated workgroup of related cables and sensors, wherein the automatically generated workgroup includes the one or more selected types of sensor measurements, and the automatically generated workgroup is determined based on identifying one or more types of sensor measurements that are correlated with a given cable.

In another aspect, the one or more selected types of sensor measurements are associated with the synthetic fiber cable or are associated with a workgroup that includes the synthetic fiber cable and one or more physical assets different than the synthetic fiber cable.

In another aspect, the sensor data includes a first subset of sensor data that includes sensor measurements indicative of a physical property of the synthetic fiber cable, wherein each sensor measurement of the first subset is obtained from a respective sensor associated with the synthetic fiber cable, and a second subset of sensor data that includes sensor measurements corresponding to a surrounding environment of the synthetic fiber cable.

In another aspect, at least one sensor measurement of the first subset is obtained using a sensor coupled to the synthetic fiber cable.

In another aspect, the sensor coupled to the synthetic fiber cable comprises a fiber optic sensor.

In another aspect, at least one sensor measurement of the first or second subset of sensor data is obtained using a battery-powered sensor, the battery-powered sensor includes a transceiver for communicating with a receiver associated with the database.

In another aspect, one or more sensor measurements of the plurality of sensor measurements are obtained using a non-contact sensor coupled to the synthetic fiber cable or associated with a surrounding environment of the synthetic fiber cable.

In another aspect, at least a portion of the sensor data is obtained as sensor measurements transmitted intermittently by an intermittent reporting sensor included in the plurality of sensors.

In another aspect, the method further includes configuring the intermittent reporting sensor with one or more pre-determined reporting thresholds. The intermittent reporting sensor remains in a low power mode and does not report collected sensor data that is below at least one of the pre-determined reporting thresholds. The intermittent reporting sensor exits the low power mode and reports collected sensor that exceeds at least one of the pre-determined reporting thresholds.

In another aspect, at least one sensor measurement of the second subset is obtained from a sensor associated with an asset deployed in the surrounding environment of the synthetic fiber cable.

In another aspect, the second subset of sensor data includes environmental kinematic measurements or baseline movement information determined for the surrounding environment of the synthetic fiber cable.

In another aspect, the method further includes performing motion compensation for the first subset of sensor data associated with physical properties of the cable, wherein the motion compensation is performed based on the environmental kinematic measurements or baseline movement information associated with the surrounding environment of the synthetic fiber cable.

In another aspect, performing the motion compensation includes generating a refined version of the first subset of sensor data that removes the baseline movement information associated with the surrounding environment of the synthetic fiber cable.

Example Embodiments

Additional features and advantages of the disclosure will be set forth in the description which follows and in part, will be obvious from the description or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

Cabling systems can be incorporated in a variety of environments, including but not limited to maritime activity. Boat crews often utilize cable systems to perform docking, anchoring, towing, and rigging, which are essential actions for securing marine vehicles. In order to ensure that the cabling systems utilized, including a plurality of cables, is operational, functional, and uncompromised, the cabling systems need to be routinely inspected and observed in order to ensure that a replacement isn't needed to ensure that an object that is being secured by the cabling system is not subject to a safety risk, or a risk of loss.

In some examples, the inspection of various cables can occur manually or visually, where a member of the crew will physically handle and inspect the cabling system in an effort to detect or identify any structural compromises of one or more cables in the cabling system. These inspections are often instructed by manuals and/or procedures created by a manufacturer or operator of the cabling system, where instructions are provided for performing a thorough inspection. However, despite the available procedural approaches, the visual inspection of cables remains a highly subjective process that is subject to various sources of error. Visual inspections can also miss (e.g., fail to identify) some types of damage that can occur to a cable. When exposure to damaging conditions does occur, damage to the cable can manifest in various ways, some of which make it difficult or even impossible to determine what has happened to the cable. For instance, the exposure of a cable (e.g., a synthetic fiber cable) to damaging or adverse environmental conditions may not be represented visually, in either an external visual inspection of the cable and/or in an internal visual inspection of the cable strands. Errors that occur in the visual inspection of a cable can result in passing cables that have undetected damage or other significant problems. Often, the uncertainty associated with visual inspections of cables can result in a cable being retired too early (e.g., a conservative approach, which can present operational and financial challenges) or the cable being retired too late (e.g., an aggressive approach, which can pose a significant safety risk).

In some examples, testing devices can be implemented within the cabling system. For example, a tension meter can be used to measure the tension of a cable in the cabling system to determine if the tension is above or below an acceptable level for continued use in operation. In other examples, various forms of non-destructive testing and/or destructive testing can be performed for a cable. However, many forms of existing testing for cables and cable systems require that the cable first be taken out of service in order to perform the test, which can be undesirable or even impossible. For example, many forms of testing are not viable for cables that are constantly under tension (e.g., cables that remain under tension for their entire lifetime from deployment to retirement).

Notably, visual inspections and the various other forms of existing cable testing approaches provide only snapshots in time, which are not predictive of the overall condition of the cable and are not indicative of the past conditions experienced by the cable. For example, cables can age and wear non-linearly over time (e.g., wearing more rapidly near the end of the cable's lifetime), such that passing a visual inspection or conventional cable testing procedure may be seen to indicate (at best) that the cable's condition is acceptable at the current moment in time. Accordingly, there is a need for systems and techniques that can be used to address these problems and more, without suffering the deficiency in predicted future performance that is common to existing approaches.

There is also a need for systems and techniques that can be used to analyze one or more cables based on a more complete understanding of the work done by the cable over time. For example, as disclosed herein, the work history of a cable can be a strong predictor of the future performance of the cable. The work history of a cable can include the physical work performed by the cable (e.g., duration of load, magnitude of load, shock loading events, etc.) and/or can include the environmental history of a cable (e.g., temperature, location, etc.). As noted above, existing approaches are based on various different types of inspections or tests that each provide a snapshot of the cable condition corresponding to a discrete moment in time, and as such, are not representative or indicative of the effects of a cable's cumulative work history.

As such, there is a need for systems and techniques that can be used to reliably capture information indicative of the work performed by cables over time and the environmental exposure(s) of cables over time. There is a further need for systems and techniques that can generate improved predictions of future cable performance based on integrating and analyzing cable information that is both obtained over time and obtained over a plurality of different data sources or modalities, as will be described in greater depth below.

As noted above, ensuring that the structural and physical characteristics of the cabling system are uncompromised is paramount to ensuring the safety of the secured object. Existing technology focuses on looking at the current state of a cable and is not indicative of conditions the cable was subjected to. This leaves a significant gap in the understanding of the condition of a cable since testing methods have limited capabilities to infer conditions a cable was exposed to. Further, field testing systems are cumbersome and many times impractical since they require operations to cease while testing is conducted.

The disclosed technology addresses the need in the art for a cable system analysis service for analyzing, inspecting and monitoring cable systems including a plurality of cables. As will be described, example embodiments of the present disclosure enable a cable analysis service to ingest data received from a plurality of sensors that are in communication with the cable, process the data, and make a series of determinations to manage the cable system and the corresponding maintenance schedule. The plurality of sensors can measure a plurality of characteristics of the cables such as the tension, temperature, location, and time of the collection of data.

FIG. 1 illustrates an example communication diagram of a cable analysis system 100, according to aspects of the disclosure. The cable analysis system 100 is configured to manage cables (e.g., cables associated with or registered to the cable analysis system 100) in order to manage their longevity, schedule maintenance and action plan in order to ensure that the structural characteristics of the managed cables remain above a predetermined threshold. The cable analysis system 100 can include a central network 102 that is configured to maintain the communication between one or more systems of the cable analysis system 100 including a database 104, a cable system 106, a sensor module 108, and an internal computing system 112.

The sensor module 108 of the cable analysis system 100 includes a plurality of sensor systems 110*a*-110*b* (a first sensor system 110*a* through an Nth sensor system 110*b*). For example, the sensor systems 110*a*-110*b* can be arranged within (or otherwise disposed on, about, or near) one or more of the plurality of cables, or along multiple locations throughout the cable system 106. The sensor systems 110*a*-110*b* are of different types and can be arranged about the cable system. For example, the first sensor system 110*a* may be a tension meter, and the Nth sensor system may be a temperature sensor. Other exemplary sensor systems include a location services sensor such as a potentiometric position sensor, a time monitoring sensor such as a timing device, a camera sensor system, a lidar sensor system, a radar sensor system, global positioning system (GPS) sensor systems, inertial measurement units (IMU), infrared sensor systems, laser sensor systems, sonar sensor systems, and the like.

The sensor module 108 can communicate with the internal computing system 112 through the central network 102. The internal computing system 112 is in communication with the sensor systems 110*a*-110*b* and the database 104. The internal computing system 112 includes at least one processor and at least one memory having computer-executable instructions that are executed by the processor. The computer-executable instructions can make up one or more services responsible for controlling the cable analysis system 100, communicating with the database 104, and receiving inputs and logging metrics regarding data collected by sensor systems 110*a*-110*b* and operators of the system.

The internal computing system 112 can include a control service 114 that is configured to control operation of the cable system 106, and the sensor module 108. The control service 114 receives sensor signals from the sensor systems 110*a*-110*b* as well communicates with other services of the internal computing system 112 to effectuate operation of the cable analysis system 100.

The internal computing system 112 can also include an analysis service 116 that is configured to receive data from the sensor module 108 and analyze the data to train or evaluate machine learning algorithms for managing the cable system 106. The analysis service 116 can also perform analysis pertaining to data to associate the data from the sensor systems 110a-110b with one or more warning events associated with the cables of the cable system 106 reported by the sensor module 108. As the data from the sensor module 108 is processed by the analysis service 116, the metrics from the sensor systems 110a-110b and/or machine learning algorithms can be stored in the database 104. For instance, the database 104 can retain the raw sensor data obtained from the sensor systems 110a-110b, can retain the processed sensor data generated by processing the raw sensor data using the analysis service 116, and/or can retain processed sensor data (and associated metrics thereof) generated by providing sensor data to the one or more machine learning algorithms. In one illustrative example, information stored in database 104 can be used to determine one or more warning events associated with a particular cable. In some aspects the systems and techniques described herein can additionally be used to automatically generate one or more remediation actions for remediating the warning event, as will be described in greater depth below.

The internal computing system 112 can also include a communication service 118. The communication service 118 can include both software and hardware elements for transmitting and receiving signals from/to the internal computing system 112 through the network 102. The communication service 118 is configured to transmit information wirelessly over the network 102, for example, through an antenna array that provides personal cellular (long-term evolution (LTE), 3G, 5G, etc.) communication, or a wired or wireless local area network (LAN).

In some embodiments, one or more services of the internal computing system 112 are configured to send and receive communications to and from the cable system 106 for such reasons as reporting data for training and evaluating machine learning algorithms, requesting maintenance, sending warning events, or generating one or more remediation actions for remediating the warning events.

The internal computing system 112 can also include an instruction service 120 for sending instructions regarding the operation of the cable system 106 and the sensor module 108. For example, in response to an output of the analysis service 116 or user interface service 122, instructions service 120 can prepare instructions to one or more sensor systems 110a-110b of the sensor module 108 and the cable system 106.

The user interface service 122 is configured to present metrics, data indicators, charts, and sensor readings reported from the cable system 106 to an operator of cable analysis system 100. The user interface service 122 can further receive input instructions from an operator that can be sent to the cable system 106 or the sensor module 108.

The data that is presented in the user interface service 122 can be depicted in various dashboard visualizations that present the ingested data and/or the processed data in accordance with the sensor readings from the sensor systems 110a-110b. The ingested data can include cable data that can be collected from sensors that are installed or embedded in and around the structure of the cable and positioned near or associated with the cable through an additional modular device or system. In some examples, there can be multiple sensor systems 110a-110b installed per cable in the cable system 106.

The ingested data can also include data about the object the cable system 106 is associated with or installed on. In some examples, the cable system 106 can be installed on a winch, a crane, or a marine vehicle. Depending on the associated object, the sensor systems 110a-110b can be configured to separate the motion of the object, such as a marine vessel or crane, from the data collected from the cable. For example, the sensor systems 110a-110b can be configured to only sense and report data if movement is detected that is greater than the baseline boat movement. Otherwise, the sensor systems 110a-110b can be programmed to not transmit, nor report data, and remain in a low power mode.

The ingested data can also include environmental data. The environmental data can include the climate, temperature, weather, or other environmental conditions that the cable system 106 is exposed to. In some examples, a sensing box can be installed on the object, and associated with the cable system 106, to collect the environmental data. The collection of the environmental data from the sensing box provides context to the data collected from the sensor module 108, and can be integrated with the sensor reading collected from the sensor module 108. The integration of the environmental data can result in an establishment of a steady state or baseline information related to the normal environmental conditions, in order to make a plurality of determination that indication how environmental changes can affect the structural integrity of the cable system 106.

In some examples, the sensing box can include one or more of fiber optic sensors, battery powered intermittent reporting sensors, and passive sensors. The passive sensors can be coupled to an interrogator, in order to perform intermittent reporting, triggering sensing, or a combination thereof.

Accordingly, the dashboard can be utilized in order to provide a visual representation of the data that is collected based on each of the above described examples.

Figure 2:
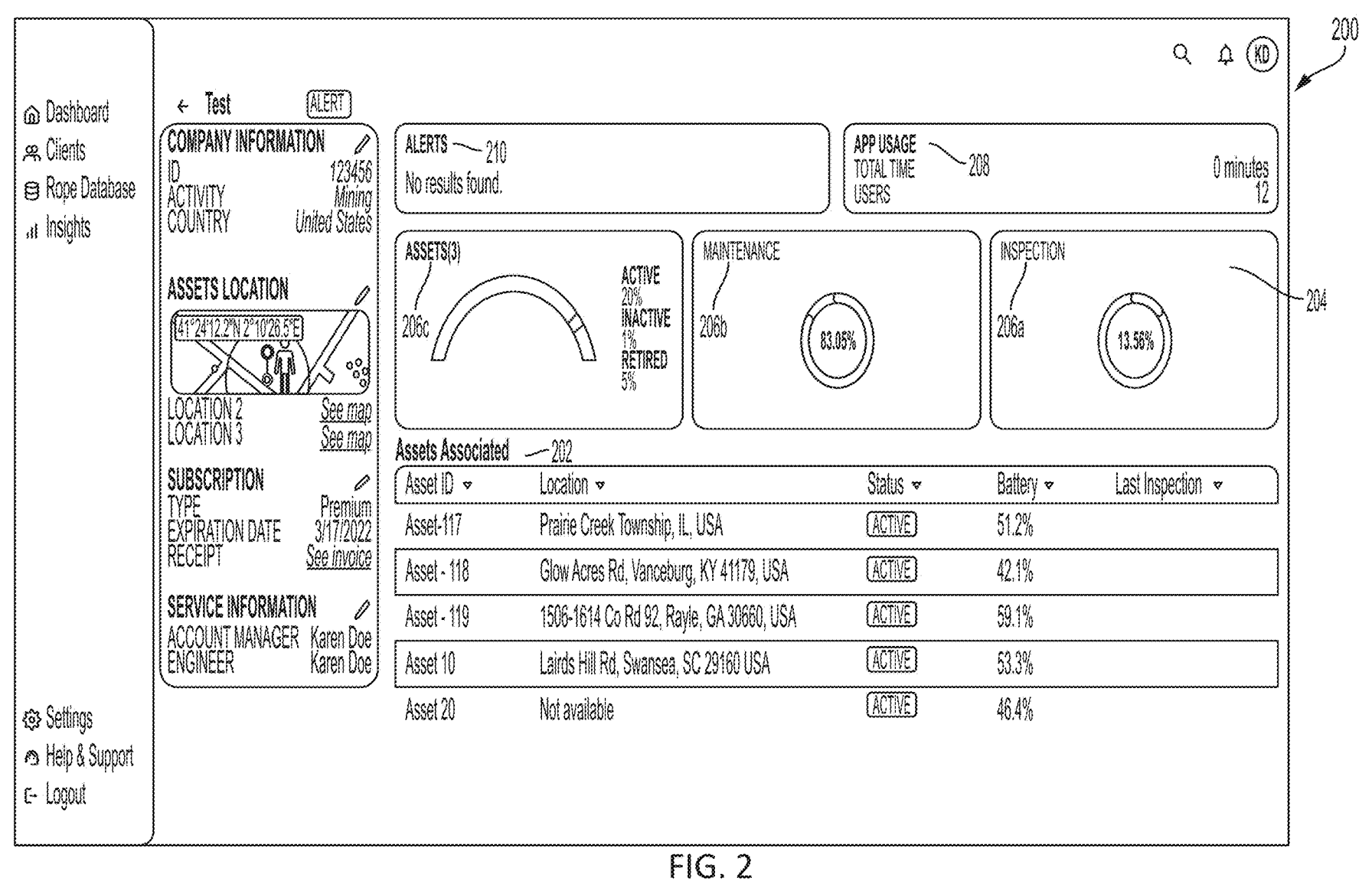

FIG. 2 illustrates an example dashboard 200 that can be used to monitor the performance of a plurality of cables of one or more cable systems 106 of a cable analysis system 100, according to aspects of the disclosure. The dashboard 200 can provide a variety of indicators that provide information as it relates to various cables within the cable system. The indicators (and associated information) can be generated and/or presented by the dashboard 200 automatically and/or dynamically (e.g., while the various cables within the cable system are in use). The dashboard 200 can be presented within a graphical user interface accessible by a computing device, or various user equipment and computing devices. The cable performance indicators presented by the dashboard 200 can further be transposed into additional data indices for additional analysis and/or can be used to train one or more machine learning networks or artificial intelligence models.

As illustrated in FIG. 2, the dashboard 200 can include a list of associated assets 202 that includes a set of cables and an associated location for each respective cable of the set of cables. In some embodiments, each respective cable can be depicted in the list of associated assets 202 using a unique Asset ID. For example, a unique Asset ID can be assigned to or otherwise associated with each respective cable during an onboarding or registration process with the cable analysis system described herein. As such, a user of the cable analysis system (e.g., a user associated with a particular user account having permissions to view and manage one or cable systems each having one or more lists of associated assets 202) can manage multiple cable system within the dashboard 200.

As depicted in the example of FIG. 2, the dashboard 200 can permit a user to view an identifier of the asset, a location of the asset, a status of the asset (e.g., whether the asset is active or inactive, etc.), a battery life of one or sensors or sensor systems associated with the asset, and a date of last inspection of the asset, among various other types of information that may be associated with a cable or other asset.

The dashboard 200 can also include an app usage indicator 208. The app usage indicator 208 can include a total number of users that have been provided access to one or more cable systems managed by the cable analysis system, or more particularly, a quantity of users that have been provided access to the cable analysis system 100 and its associated dashboards (e.g., such as dashboard 200). In some embodiments, the quantity of users depicted in the app usage indicator 208 can correspond to the quantity of unique user accounts that have been registered or otherwise provided in association with a particular set of assets or cable systems. The app usage indicator 208 can further provide an administrative user with usage data indicative of the total amount of time that the set of registered users (and/or each individual user of the set) has accessed the dashboard 200 and/or utilized the cable analysis system 100.

The dashboard 200 can further include an alerts indicator 210. The alerts indicator 210 can provide a user of the dashboard 200 with a plurality of alerts that are relevant to the overall management and operation of the assets listed in the list of associated assets 202. For instance, the alerts can indicate to a user that a cable system 106 (e.g., one or more particular cables registered with the cable analysis system 100 and associated with the user's account) is in need of maintenance, an inspection, or attention based on a status change or other triggered alert.

One or more alerts within alerts indicator 210 can be triggered based on information that is also indicated by a status module 204, shown here as including a plurality of status indicators 206a-206c. As such, the status module 204 can include a graphical view of the status of the assets managed by the cable analysis system, and various remedial actions that need to be proactively monitored in order to ensure longevity of operation based on the status indicators 206a-206c. Specifically, the status module 204 can include a status update indicator 206c that quantifies an amount of cable systems 106 managed by the cable analysis system 100 and a percentage of the managed cable systems that currently associated with a particular status. For instance, the status update indicator 206c can be indicative of a percentage of active, inactive, and/or retired assets represented in the listing of associated assets 202. The status module 204 can further include a maintenance status indicator 206b, for example indicative of a percentage of maintenance tasks that have been completed. The status module 204 can further include an inspection status indicator 206a. The inspection status indicator 206a can be indicative of a percentage of the assets in the listing of associated assets 202 that are in need of an inspection. In some aspects, the inspection status indicator 206a can be indicative of a percentage of assets that have successfully completed or otherwise undergone a scheduled inspection.

Figure 5:
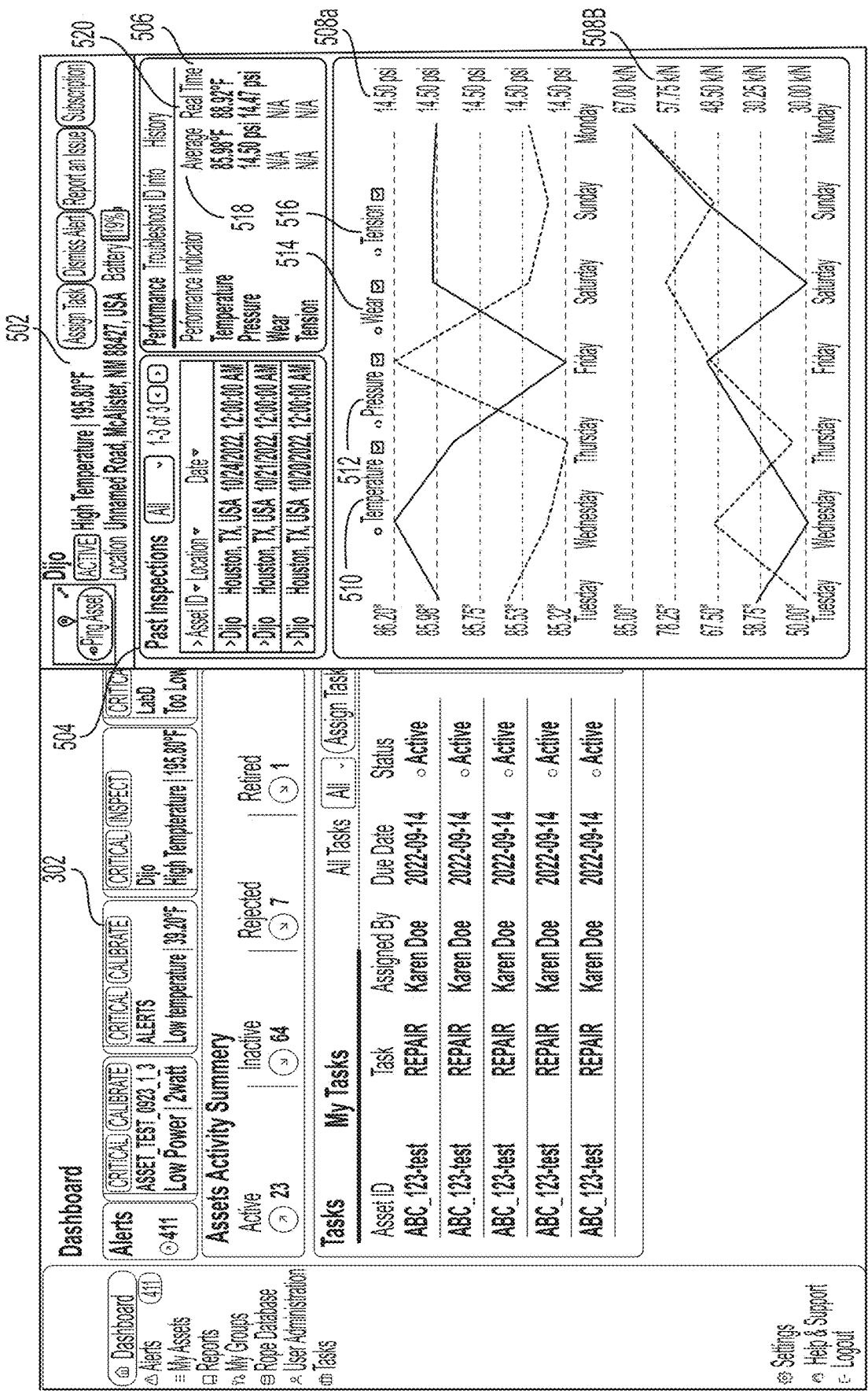
FIG. 5 illustrates an example interface for viewing an alert from the alert status indicators, according to aspects of the disclosure.

In some embodiments, various interfaces of the dashboard 200 can depict a history based comparison of the sensor readings collected from the sensor systems of the various cable systems. The details of these interfaces are described below with respect to FIGS. 3-5. With respect to the dashboard 200, as described above, the dashboard 200 can be seen to provide an operator (e.g., a user of the cable analysis system 100) with intuitive, dynamic, and effective visual representations for monitoring cable systems, cables, assets, etc. The visual representations of the dashboard 200 can be automatically updated in substantially real-time (e.g., as new sensor data is streamed or otherwise received by the cable analysis system 100), can be updated periodically at a pre-determined interval (e.g., a time interval, a quantity of sensor data received threshold, a magnitude of change threshold in one or more sensor data measurements, etc.), and/or or can be updated in an on-demand fashion. In each instance, the visual representations of the dashboard 200 can be updated based on ingesting additional (e.g., new or newly obtained) sensor data measurements and related information derived from the sensor systems 110a-110b. For example, the dashboard shown in FIG. 5, provides a table that lists various sensor-based performance indicators (e.g., including temperature 510, pressure 512, wear 514, and tension 516) that can be updated according to any of the approaches described above, as additional or changed sensor data (and/or processed sensor data) is obtained over time. As will be described in greater depth below with specific reference to FIG. 5, the dashboard can further provide an average sensor measurement value 518 (e.g., over some pre-determined period of time) and/or can provide a real-time (e.g., instantaneous) sensor measurement value 520 for each of the performance indicators.

Figure 3:
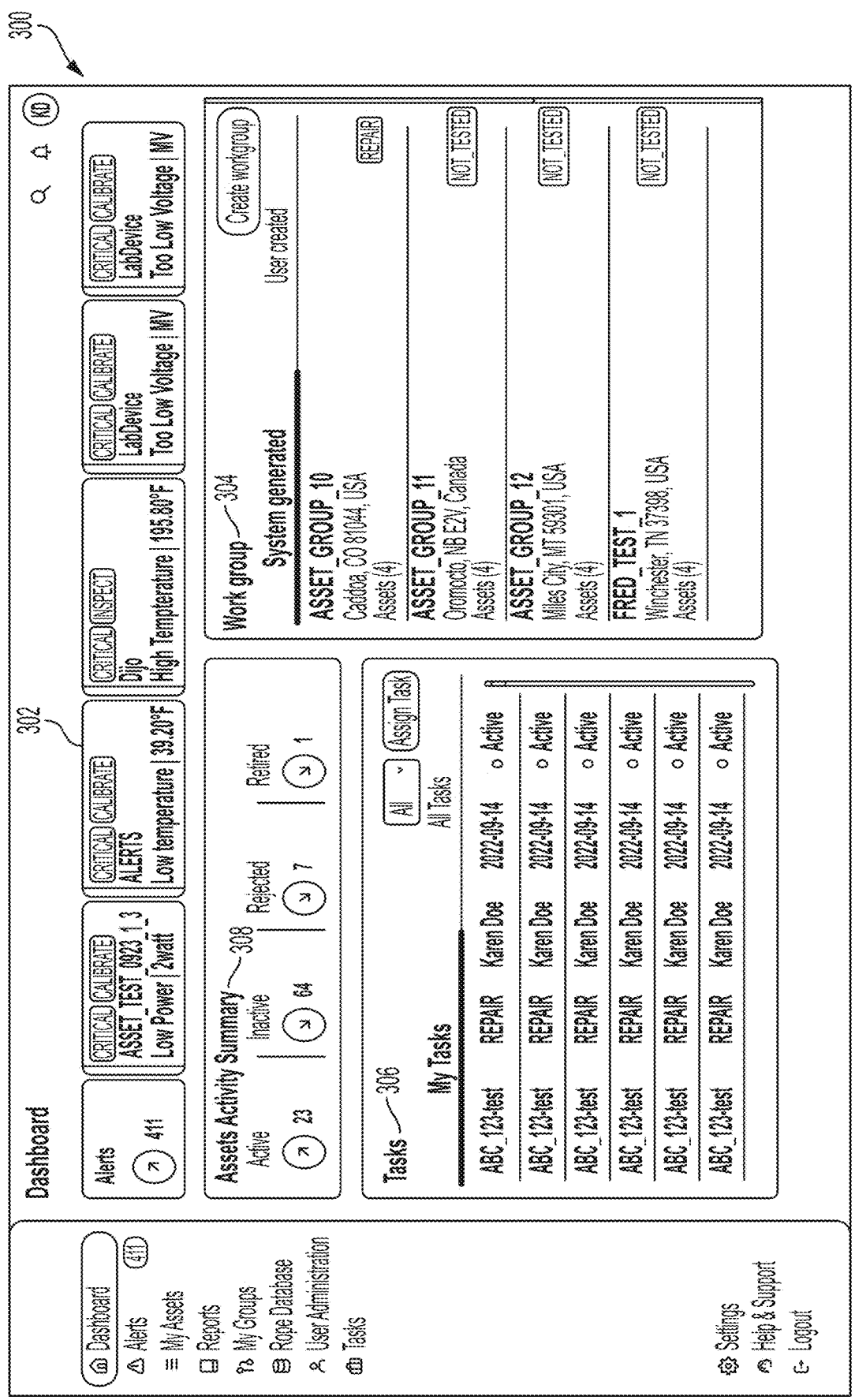
FIG. 3 illustrates an alerts module of the example dashboard, according to aspects of the disclosure.

The disclosure turns next to FIG. 3, which illustrates an alerts module 300 of the dashboard 200, according to aspects of the disclosure. The alerts module 300 is configured to alert a user of each cable system (e.g., each cable system included in or otherwise managed by the cable analysis system) of proactive activities or remedial actions that are needed. For instance, the activities or remedial actions can be referenced with respect to the particular cable(s) to which they correspond or were otherwise generated for. The alerts module can alert a user with a plurality of alert status indicators 302 that include alerts that have occurred over a period of time, or taken place during various predetermined or prescheduled operations. The alert status indicators 302 can indicate to a user the severity of the alert as it relates to the asset, where the severity can have low alert, medium alert, high alert, or critical alert status. The alert status indicators 302 can further indicate whether or not the cable system associated with the alert is in need of calibration. The alert status indicators 302 can further alert the user of the cause of the alert. For example, the cause of an alert can be determined as one or more conditions, parameters, or occurrences that triggered the cable analysis system to generate the corresponding one of the alert status indicators 302. In some cases, when the alert status indicators 302 include a suggested remedial action (e.g., a suggestion action to address the alert), the cause of an alert can be determined based at least in part on the type of remedial action that is suggested for the alert.

The alert status indicators 302 and data associated with each of the alerts in the alert status indicators 302 can be grouped into a variety of work groups in a work group module 304. In particular, in the context of the alert status indicators 302, the work group module 304 can be configured to organize individual alerts according to the asset group assigned to the particular cable/asset for which each individual alert was generated. In general, the alert status indicators 302 can include alerts that are assigned to a particular response team or repair user and/or that are grouped based on region, cable system, or project of an organization the cable analysis system is supporting. The workgroups can further include tasks that are assigned in a tasks module 306 by an administrator user. The tasks module 306 can be configured to automatically assign tasks based on the type of alert status from the alert status indicators 302 and/or based on a determination of a cause (or potential cause) that triggered the alert. The tasks module 306 can also be manually configured to assign tasks to one or more workgroups based on the type of alert, the type of remedial action needed, as well as the group needed in order implement an action needed to correct the alerts in the alert status indicators 302.

Based on information such as the tasks that are assigned in the tasks module 306, the alerts indicated by the alert status indicators 302, and the workgroups assigned tasks in the workgroups module 304, an assets activity summary 308 can provide a current summary of the overall or high-level status of a plurality of cables, cable systems, and/or other assets that are registered to and managed by the cable analysis system 100. For instance, in one illustrative example, the assets activity summary 308 can depict a total quantity of assets that are active, inactive, in need of repair, repaired or have been retired. Additionally, the assets activity summary 308 can include one or visual representations of a trend in each depicted quantity. For instance, each quantity can be depicted in combination with an upward or downward arrow to indicate an increasing or decreasing trend, respectively, in the depicted quantity over time. As depicted in FIG. 3, the quantity of 'Active' assets is depicted in combination with an upward arrow, indicating the total quantity of 'Active' assets is increasing over time; the quantity of 'Inactive', 'Repaired', and 'Retired' assets are each depicted in combination with a downward arrow, indicating that each of the three respective asset quantities is decreasing over time.

Figure 4:
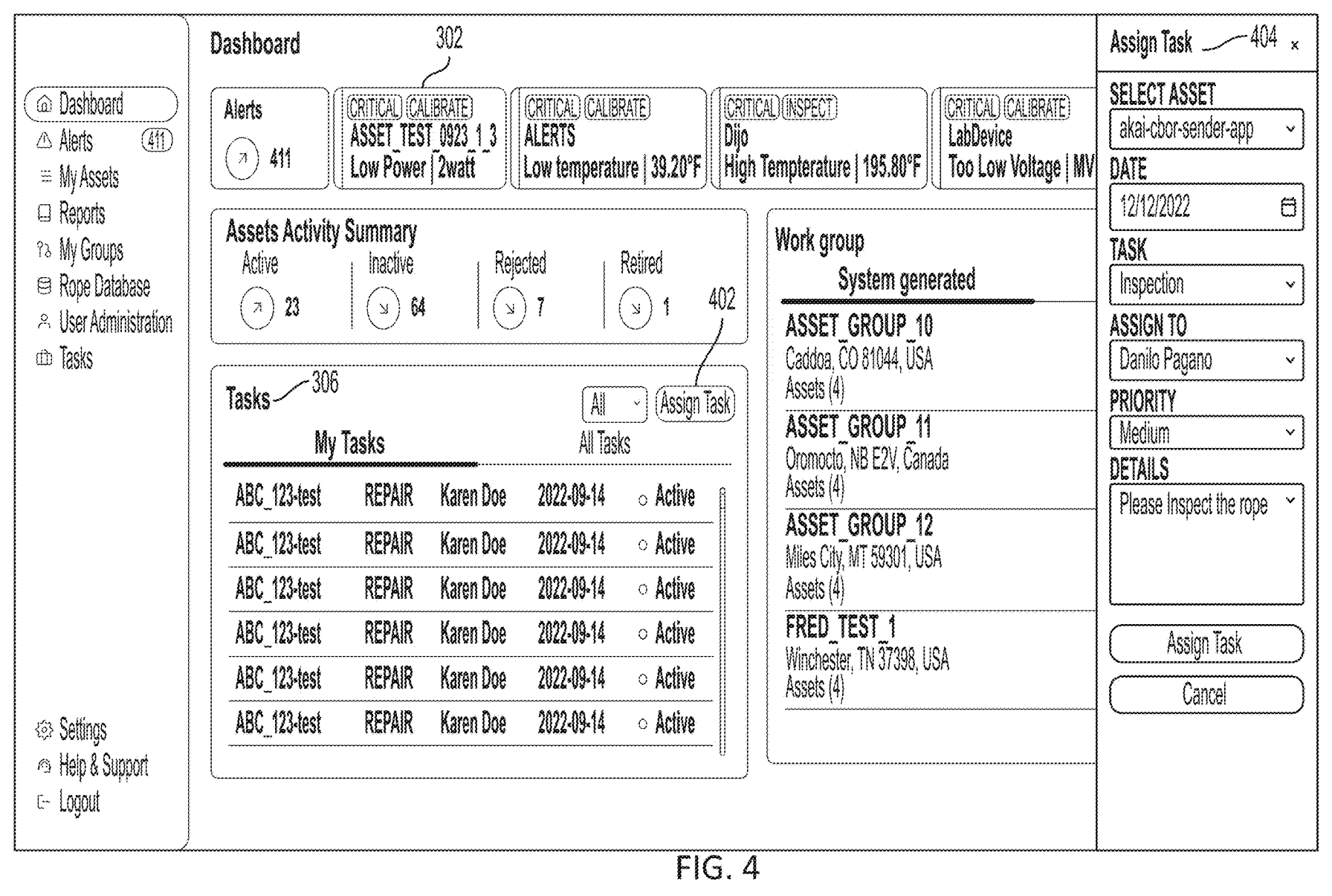

FIG. 4 illustrates an example interface for assigning a task based on one or more of the automatically generated alert status indicators 302, according to aspects of the disclosure. An administrative user can assign a task via the tasks module 306 through the selection of an assign task user interface (UI) element 402. Upon selecting the assign task UI element 402, a user can interact with an assign task interface 404. As illustrated in FIG. 4, selection of the assign task UI element 402 can cause the assign task interface 404 to be overlaid on the dashboard interface that contains the assign task UI element 402. The assign task interface 404 upon selection can be configured to receive one or more user inputs from the user, for example based on a corresponding series of prompts and/or user input fields presented in the assign task interface 404. In some aspects, the assign task interface 404 can receive user inputs related to a task assignment for a particular alert indicated in the alert status indicators 302.

In some aspects, the assign task interface 404 can be automatically populated (e.g., pre-populated) with a selected asset or Asset ID, based on the corresponding asset that was highlighted or selected when the assign task UI element 402 was first selected by the user. In some embodiments, the assign task interface 404 can automatically determine information for populating a corresponding user input field with information that can include, but is not limited to, the selected asset, the date the task is be addressed, the task assigned, the workgroup or individual the task is assigned to, and/or the priority of the task, among various others. For instance, one or more rules can be pre-defined to specify conditions for automatically populating user input fields of the assign task interface 404. In one illustrative example, the 'Task' field can be auto-populated based on the type of asset (e.g., steel cable vs. rope cable), the current date and a task history for the selected asset (e.g., compare current date to scheduled date for inspection, repair, etc., tasks), and/or unique work group-specific rules for task assignment. For instance, within a given work group, all tasks for a particular asset ID may be automatically assigned to a specified individual, may be assigned a particular priority, etc.

In some examples, the priority of the task can be automatically determined based on the type of task being assigned to the asset and/or the work group that the task is associated with. In another example, based on the task assigned a workgroup or individual can be automatically assigned along with a priority level that is typically assigned to the workgroup or individual. In some examples, a machine learning algorithm can be used to automatically assign a workgroup and a priority based on the type and/or level of alert in the alert status indicators 302 and the workgroup that is needed to be assigned. The machine learning algorithm can utilize past history of a set of alerts in the alert status indicators 302 used to train the machine learning algorithm in order to automatically assign tasks in the tasks module 306.

Prior to assigning tasks as discussed in FIG. 4, an administrative user can elect to review the alert to determine if there is additional information and data that should be reviewed prior to making a decision on actions needed on the alert. As such, an administrative user can select an alert from the alert status indicators 302 to review this data accordingly.

FIG. 5 illustrates an example interface that can be used to view an alert from the alert status indicators 302, according to aspects of the disclosure. An administrative user or an authorized user can select an alert from the alert status indicators 302 to be displayed in a graphical user interface of a user device, computing device, or other user equipment. Upon selection of a particular alert, the current data and historical data that lead to the particular alert being triggered and included in the alert status indicators 302 can be displayed in an alert summary 502.

For example, the displayed data can include a listing of one or more past inspections 504 conducted or performed for the selected asset (e.g., particular cable of the cable system). The past inspections 504 of the cable system can include a historical reference of inspections that have been performed during a period of time, and the time and date of inspections performed in response to alerts previously indicated in the alert status indicators 302.

The displayed data can further include cable system status data 506, which can include, but is not limited to, performance indicators of the cable or asset (e.g., average sensor measurements and instantaneous sensor measurements), troubleshooting history, identification information, and past performance history. The performance data can include data relevant to the temperatures effecting the cable system, pressure experienced, wear data of the cables in the cable system, and tension experienced by the cables in the cable system, etc. The performance data can be presented as raw sensor data and/or can be derived from raw sensor data (e.g., using analysis service 116 of FIG. 1, using one or more machine learning models, etc.)

Accordingly, the cable analysis system 100 and various dashboards and user interfaces described herein can be used to provide an operator with a visual representation of the monitored performance and related information of one or more cables, cable systems, and/or other monitored assets registered with the cable analysis system 100. As described previously, the cable analysis system 100 and various dashboards and user interfaces described herein can be configured to update automatically, periodically, and/or on demand. As illustrated in FIG. 5, some (or all) of the sensor data (either raw sensor data or processed sensor data) can be presented using one or more graphical interfaces. For instance, the cable system status 506 includes a table that lists a series of performance indicators including the temperature 510, pressure 512, wear 514, and tension 516. The cable system status 506 can further provide an average calculation 518, or a real-time calculation 520 for each of the performance indicators.

In one illustrative example, an operator can use the cable system status user interface element 506 (and data presented therein) to make various determinations relating to the performance of a cable, risk factors to a cable, etc. For example, factors such as temperature, pressure, wear, and tension can all affect the structural integrity of a cable, in a manner that accumulates over time. In other words, an operator may be more interested in determining the amount of time that a cable has spent under tension (or above a pre-determined tension threshold), or the quantity of temperature cycles a cable has undergone between an upper and lower temperature threshold, rather than instantaneous information. For example, an operator can review the data in the dashboard 200, from the sensor systems 110*a*-110*b* and make a determination that adjustments may need to be made to the environment or characteristics affecting the cable system.

In some examples, the determination that adjustments can or should be made can be automatically generated by the internal computing system 112 of the cable analysis system 100, for instance based on one or more predetermined thresholds. The predetermined thresholds can be preset by an operator of the cable analysis system 100 and/or can be dynamically determined based on a machine learning algorithm that determines the best conditions for the cable system based on one or more of the environmental data, the sensor data from the sensor systems, and the type of cable installed in the cable system.

Accordingly, as the cable analysis system 100 analyzes data received from the sensor systems, the machine learning algorithm can be trained to establish new thresholds based on the age of the cables, the type of cables installed, and the historical data that is established by the dashboard 200. The training data can further incorporate performance data of the performance indicators of a period of time. The period of time can be programmed and selected from weekly, monthly, or yearly performance of the sensor data collected from the cable system.

In some examples, the displayed data can further include graphical representations or performance diagrams, such as the first performance diagram 508*a* and the second performance diagram 508*b* depicted in FIG. 5, each of which include a time-series graphical representation of various performance indicators monitored by the cable analysis system.

For instance, the first performance diagram 508*a* illustrates a time-history of temperature and pressure sensor data associated with the selected asset. Here, the time-history is presented over a period of one week, although it is noted that various other time intervals may also be utilized. The time-history of sensor data can be generated based on sensor data obtained using one or more sensors or sensor systems that are configured to collect the temperature 510 and pressure 512 data associated with the selected asset (e.g., cable). The historical sensor data over the time-history interval can be obtained as stored sensor data from one or more databases associated with the cable analysis system 100. The collection of data from the temperature 510 and the pressure 512 over the first performance diagram 508*a* can include a temperature fluctuation (e.g., in degrees Fahrenheit) and a pressure fluctuation (e.g., in pounds per square inch (PSI)), over the course of a period of time (day, week, month, etc.).

The second performance diagram 508*b* illustrates a time-history of wear and tension data associated with the selected asset (e.g., cable). Here, the time-history is again presented over a period of one week, although it is noted that various other time intervals may also be utilized. The time-history of sensor data can be generated based on sensor data obtained using one or more sensors or sensor systems that are configured to collect the wear 514 and tension 516 data associated with the selected asset (e.g., cable). The collection of data from the second performance diagram 508*b* can be directed towards displaying correlations with the wear experienced by cables in the cable system as it compares to the tension experienced when under operation or experiencing various load conditions.

In some examples, the cable analysis system 100 can automatically make determinations from the data, or an operator can make a manual determination based on associations between at least two of the performance indicators. The determinations can be made from the retrieval, for each selected type of sensor measurement, a set of time series sensor measurements of the selected type, where each stored sensor measurement is associated with a different timestamp. From an analysis of the timestamps, warning events can be determined that are associated with the cable. In some aspects, the warning events can be used or configured to automatically generate one or more remedial actions for an operator or the cable system for remediating the warning event.

In some examples, patterns can be determined from the determinations of the associations between the performance indicators and the sensor measurements. The patterns can be determined based on time-independent and time-dependent correlations associated with the use of the cables. In some aspects, the patterns can be determined based at least in part on using one or more trained machine learning models to analyze raw or processed sensor data. For example, the one or more trained machine learning models can be trained using training data comprising historical sensor measurements associated with an asset and the corresponding outcomes or events experienced by that asset. For instance, historical temperature, pressure, wear, tension, etc., data can be obtained for a particular asset or type of asset (e.g., particular cable or type of cable) and can be labeled with various outcomes and events experienced over the lifetime of that cable. In one illustrative example, the training data can be labeled with outcomes such as failure of the cable, overstress of the cable, various degradations of the cable, etc. The sensor measurements in the training data and the labeled outcomes associated with the asset can be associated with timestamps, such that sensor measurements corresponding to the interval of time prior to the occurrence of a labeled outcome (such as failure of the cable) can be identified and used to train the machine learning model. In some embodiments, the sensor measurements and performance indicators can be used by the systems and techniques described herein to determine a usage level associated with the asset (e.g., cable). The usage level can then be compared to various thresholds generated from the determinations and historical data to determine if a threshold has been met, a warning event has been created, and if and when remedial action is needed.

In some examples, the warning events can be customized by configuring one or more parameters and/or alerts that are used to trigger a system action (e.g., such as the warning events). For example, a customized configuration can include a specified alarm, warning, or threshold that triggers the cable analysis system 100 to create a warning event that will generate a remediation action to address structural characteristic changes of a cable that is considered outside of a normal or safe parameter. In some examples, the sensor data can be used to automatically generate one or more predictions for an asset (e.g., cable) associated with the sensor data. The predictions can include a determination of the remaining lifespan of a cable based on the observed wear and environmental conditions affecting the cable system. Accordingly, based on the predictions, the first performance diagram 508*a* and the second performance diagram 508*b* can further display warning lines and thresholds, indicating a harmful threshold that could trigger a compromising event that could jeopardize the integrity of the cable system. In some examples, a plurality of reports can be generated that include the sensor data from the sensor systems and predictions on the lifespan of one or more cables.

Figure 6:
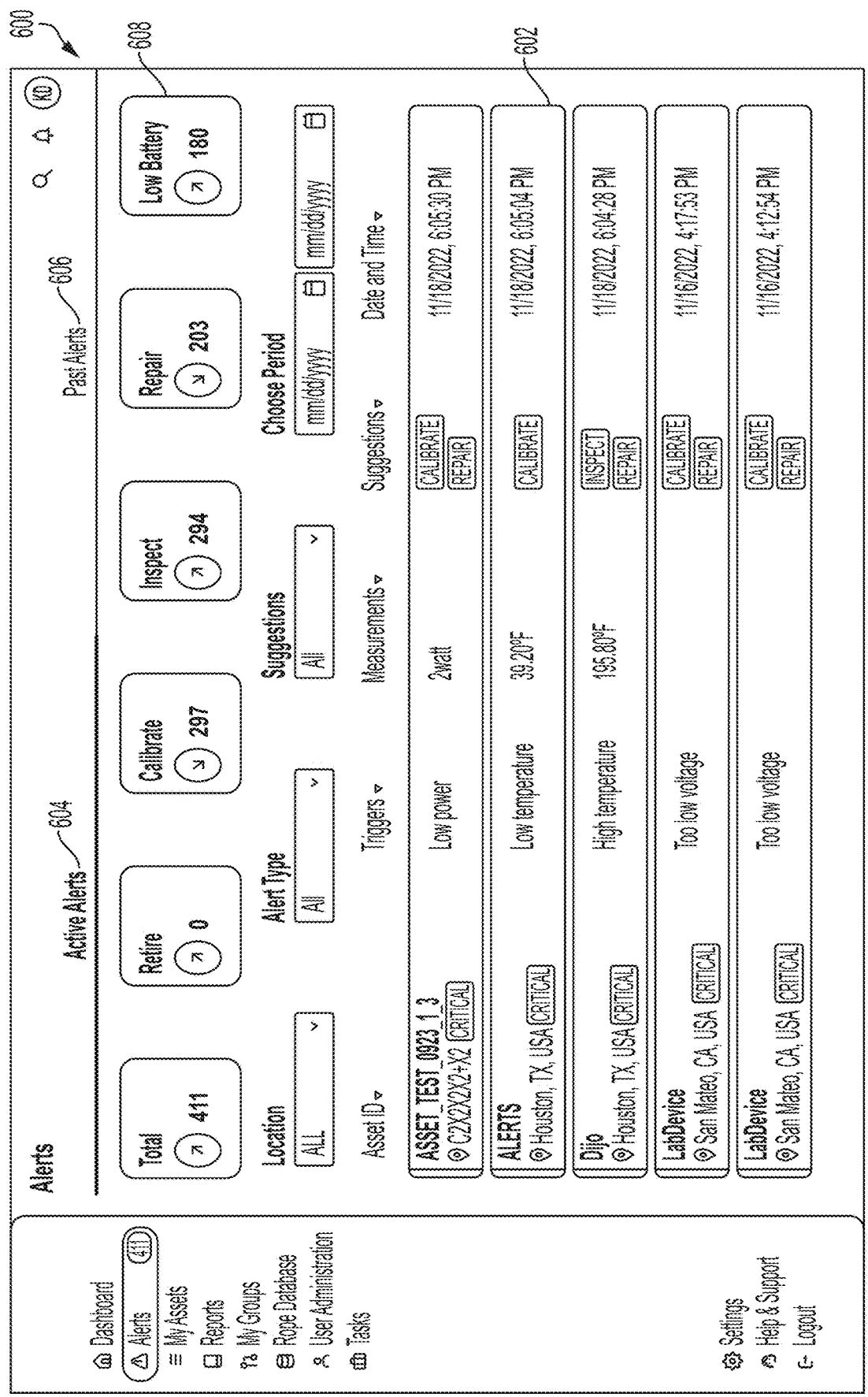
FIG. 6 illustrates an alerts summary module in the cable analysis system, according to aspects of the disclosure.

FIG. 6 illustrates an example alerts summary module 600 that can be included in the cable analysis system 100, according to aspects of the disclosure. The alerts summary module 600 can include a historical list of alerts 602 received for various assets registered with the cable analysis system 100. In some embodiments, the historical list of alerts 602 can represent alerts received for a particular set of assets within a pre-determined time period, as monitored and tracked by the cable analysis system 100. In some embodiments, the cable analysis system 100 can be configured to receive data from all monitored cable systems, and utilize the data to determine if an alert is to be triggered based on the levels of the data reaching one or more thresholds. Upon a threshold being met, the cable analysis system 100 can determine that an alert in fact has been triggered, and may subsequently update the list of alerts 602 in the alerts summary module 600.

In some examples, the list of alerts 602 can be categorized, or filtered to be specific to a particular location of a cable system, a type of alert, a particular suggestion of remedial action related to the alert and range of dates the alerts may have occurred. In some examples, the list of alerts 602 can be categorized or otherwise filtered using various parameters. For instance, the list of alerts can be categorized into a set of active alerts 604 and a set of past alerts 606 (among various other categorization and/or filtering schemes that may be utilized within the scope of the present disclosure). Within each of these categories, an activity status summary 608 can be provided for all of the alerts included within the category. For example, upon selecting active alerts 604 or past alerts 606, the interface can display a total quantity of alerts within the category, a quantity of retired alerts, a quantity of alerts indicating that a cable system needs to be calibrated, a quantity of alerts indicating that a cable system needs to be inspected, a quantity alerts indicating that a cable system needs to be repaired, and a quantity of alerts indicating that a cable system may have one or more associated sensors with a low battery level. Each status indication can be further associated with a trend indicator, indicative of whether the quantity of each type of alert has increased or decreased over a pre-determined interval of time. For instance, as illustrated in FIG. 6, the 'Total', 'Retire', 'Inspect', and 'Low Battery' alert status indications have shown an increasing trend, as indicated by the upward arrow provided in combination with each respective one of these four alert status indications; the 'Calibrate' and 'Repair' alert status indications have shown a decreasing trend, as indicated by the downward arrow provided in combination with each respective one of these two alert status indications. In some aspects, the alerts that are received within the alerts summary module 600 can be used to trigger and/or perform additional analysis, either automated and/or manual, to determine a remedial action that should take place to address the alert, as well as a workgroup to assign the alert.

Figure 7:
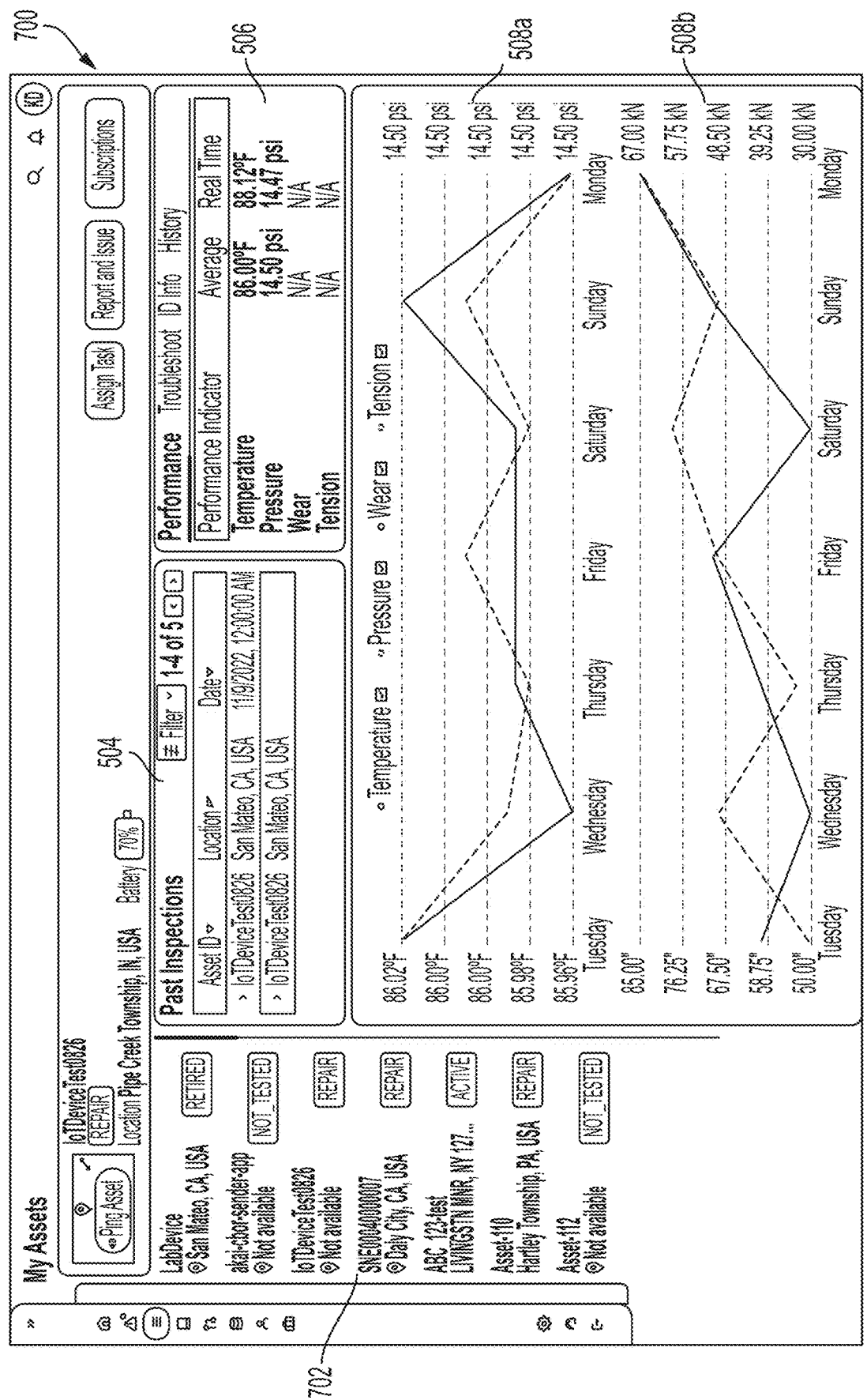
FIG. 7 illustrates an example asset view module of the cable analysis system, according to aspects of the disclosure.

FIG. 7 illustrates an example asset view module 700 of the cable analysis system 100, according to aspects of the disclosure. The asset view module 700 can be configured to provide an interface that depicts an overall health summary of an asset (e.g., cable or cable system) that is monitored and tracked by the cable analysis system 100. For example, the asset view module 700 can be used to provide more detailed reporting on historic and current information obtained for a selected asset and/or can be used to provide more detailed reporting on historic and current derived (e.g., processed or predicted) information determined for the selected asset.

For instance, the asset view module 700 can be presented by a user interface of the cable analysis system 100 in response to a user selection of a particular asset. As illustrated in FIG. 7, the particular asset can be received with reference to a listing of available assets for detailed inspection in the assert view module 700 (e.g., the left-hand asset listing column depicted in the example interface of FIG. 7). In response to receiver the user selection of the particular asset, the asset view module 700 can display historical data that incorporates a past inspection history of the asset. In some embodiments, the asset view module 700 can display the past inspection history 504 as described above with respect to FIG. 5. The asset view module may additionally, or alternatively, display a cable system status information, which can be the same as or similar to the cable system status information 506 of FIG. 5. Accordingly, data relevant to the past inspection of the asset can provide data indicators that may be relevant to the remedial actions that are manually or automatically assigned to a work group associated with the asset. The cable system status 506 can provide data that provides a real-time calculation 520 as well as an average calculation 518 that assist with validating the alert received, and evaluating the type of remedial action that is needed in order to address concerns caused by temperature 510, pressure 512, wear 514 or tension 516.

The asset view module 700 can also include a graph view of the data included in the cable system status 506, in a first performance diagram 508*a*, and a second performance diagram 508*b*. Each of the first and second performance diagrams 508*a*-508*b*, provide a historical view of the data over the course of multiple days, providing the ability to identify various correlations between the data, as it relates to various environmental and workload effects.

The asset view module 700 can further include a selection pane 702 that provides a user the ability to select and access detailed information of various other assets that are associated with the user. For instance, multiple asset summaries can be viewed and selected in the selection pane 702. In some examples, the selection pane 702 can be pre-populated based on an assigned workgroup and authorization or a verification of access credentials to the workgroup. Therefore, a user assigned to a workgroup is able to view all alerts that are assigned to the workgroup and assign task, or review data relevant to the alert that is in need of repair, or to monitor current status of other assets under the workgroup assignment.

Figure 8A:
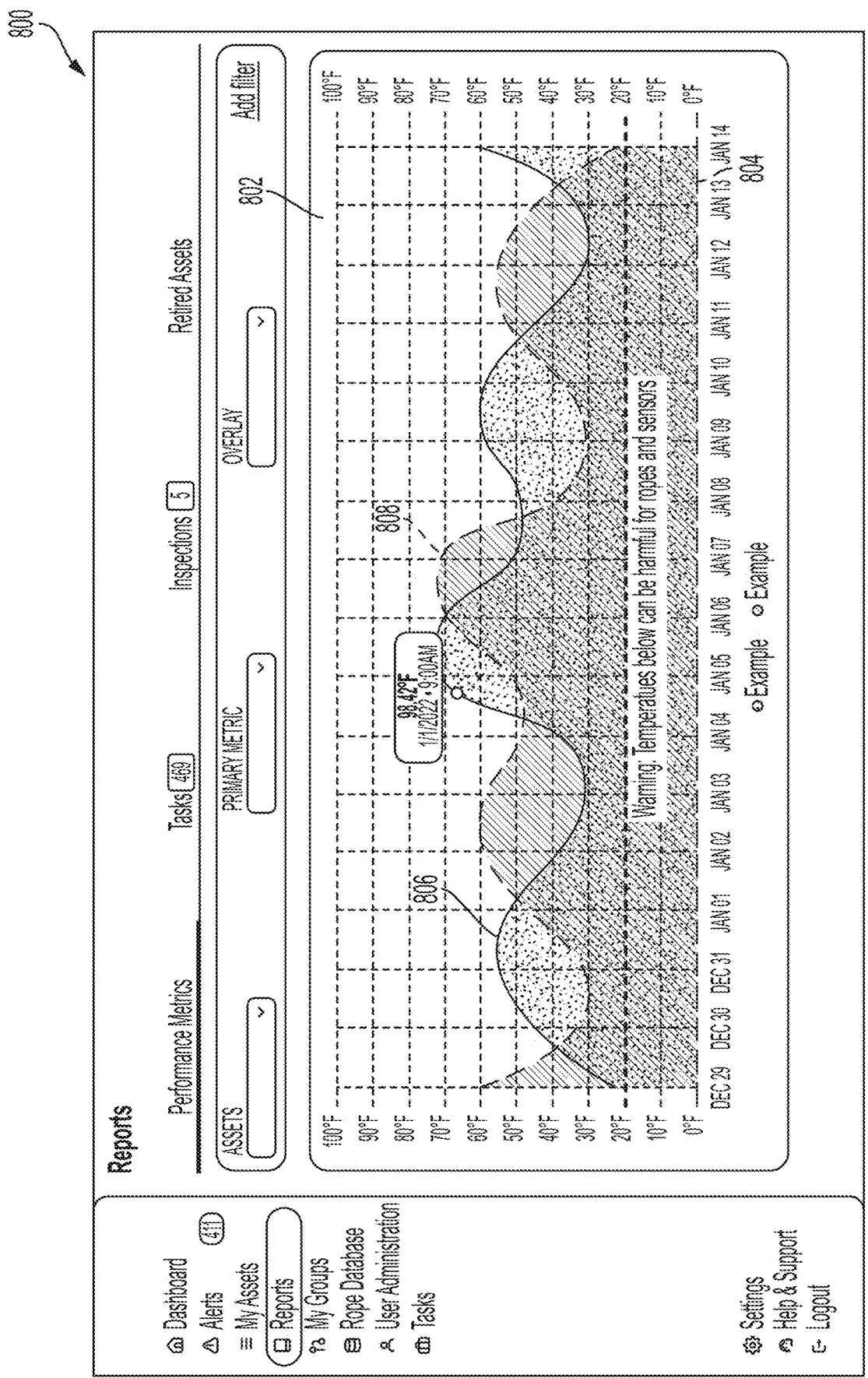
FIG. 8A illustrates an example reporting module for providing performance metrics of a cable or other asset associated with the cable analysis system, according to aspects of the disclosure.

FIG. 8A illustrates an example reporting module 800 that can be included in the cable analysis system 100 and/or can be used to generate one or more dashboards or other user interfaces associated with the cable analysis system 100. In one illustrative example, the reporting module 800 can be used to generate a dashboard view that includes one or more performance metrics of an asset (e.g., cable or cable system) registered with the cable analysis system 100. The reporting module 800 can be configured to display a report in a graph view of a user interface. The graph view can provide a visual representation of the current and/or historical conditions experienced by an asset (e.g., cable) monitored by the cable analysis system 100. The experienced conditions can include, but are not limited to, various sensor measurement values such as temperature, pressure, wear, tension, etc. The experienced conditions can additionally, or alternatively, include one or more processed or predicted values that are determined based at least in part on the sensor measurement values. In some aspects, the sensor measurement values used to generate the graphical representation(s) of the reporting module 800 can be the same as or similar to those provided in the cable system status information 506 and/or the first and second performance diagrams 508*a* and 508*b*, as are depicted in FIG. 5.

In a non-limiting example, as shown in the example graphical representation 802 of FIG. 8A, a first data indication 806 can be generated for a particular asset and may be depicted as a time history of sensor measurement values of a first type (shown here as temperature). A second data indication 808 can be generated for the particular asset and may be depicted as a time history of sensor measurement values of a second type, different from the first type. A greater or lesser quantity of different data indications (e.g., different sensor measurement types) can be overlaid on the graphical representations generated by the reporting module 800, without departing from the scope of the present disclosure. The selection of the different data indications to be overlaid on the same graphical representation (e.g., such as graphical representation 802) can be user-selected and/or can be automatically determined by the cable analysis system 100.

The graphical representation 802 can further include one or more warning thresholds, such as the warning threshold 804 depicted in FIG. 8A. The warning threshold 804 can be indicative of an upper or lower boundary of safe or acceptable sensor measurement values, wherein sensor measurement values beyond the warning threshold 804 can represent an unsafe or undesirable operating condition of the associated asset (e.g., cable). For instance, the warning threshold 804 represents a lower temperature threshold, below which a cable may suffer physical damage, degradation, and/or reduced operating capabilities and characteristics.

In some examples, the cable analysis system 100 can automatically trigger an alert based on the first data indication 806 and/or the second data indication 808 reaching or crossing the warning threshold 804. For instance, the alert can be triggered based on the warning threshold 804 being crossed a single time, based on the number of times the data indication 806 or 808 has fallen below or met the warning threshold 804, or based on the length of time the data indication 806 or 808 has fallen below the warning threshold 804, etc. In some examples, the graphical representation 802 generated using the reporting module 800 can be adjusted to dynamically modify the warning threshold 804 and/or one or more of the data indications 806,808 to provide a further analysis of the conditions experienced by the cable system.

In some examples, an overlay of previously generated graphical representations 802 (e.g., generated during a similar period of time) can be used to compare the conditions currently being experienced by the asset or cable, in order to thereby evaluate a pattern of conditions that require various remedial efforts by a workgroup. In some examples, a machine learning algorithm can be trained to dynamically adjust the warning threshold 804, in order to evaluate how certain conditions, such as temperature, pressure, wear, and tear effect types of cable systems in various regions, or model of cable system. The machine learning algorithms can output an alert based on a predicted remedial action, inspection task, or planned maintenance. In some examples the machine learning algorithm can evaluate the age of the cable system monitored, the amount of wear and tension experienced over a period of time in certain environment conditions, and determine that maintenance likely will be needed during a specified time period. This time period can be dynamically adjusted based on the continued changing conditions, and on the workload experienced by the cable system.

Figure 8B:
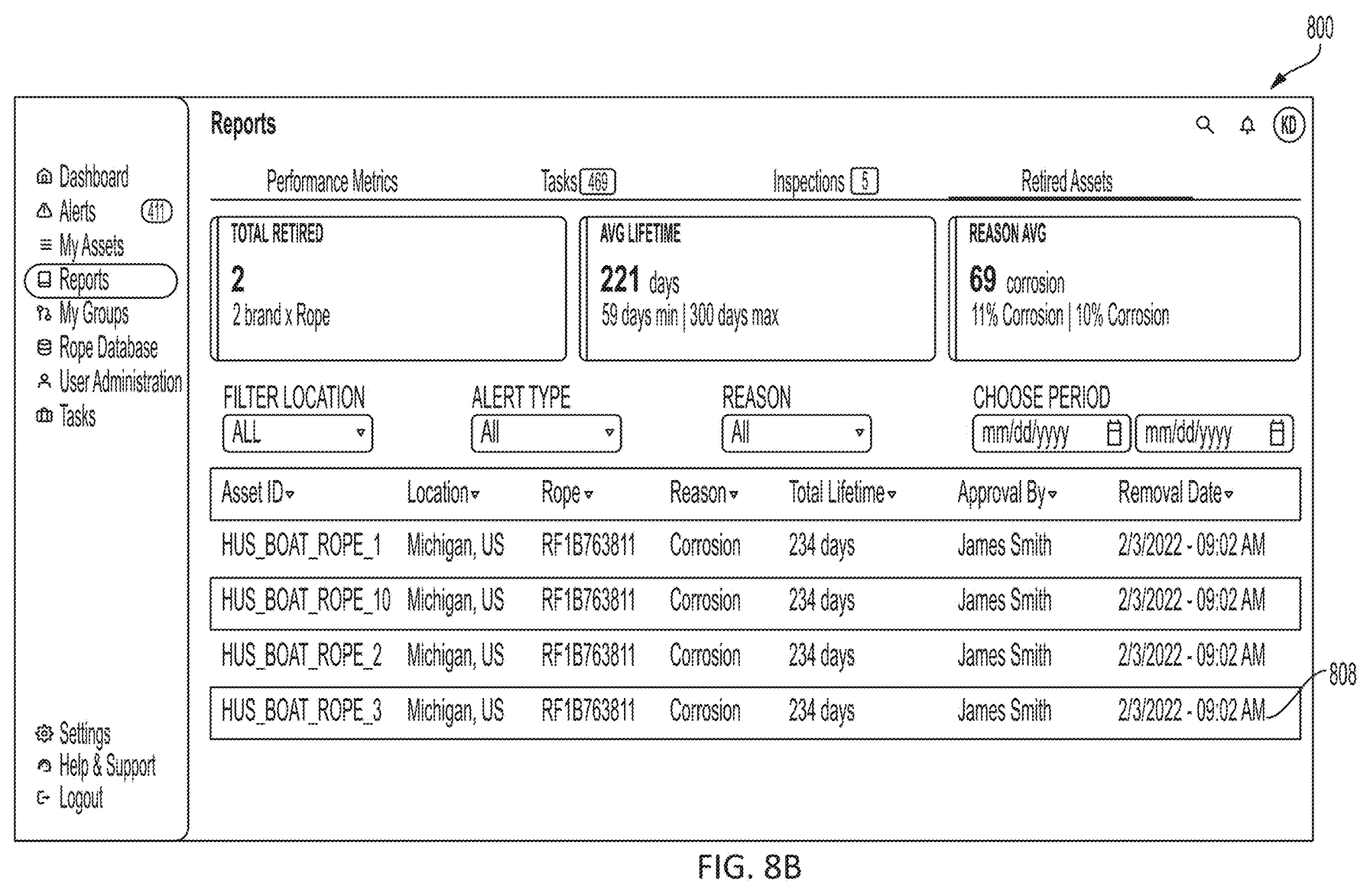

FIG. 8B illustrates another example dashboard interface that may be associated with reporting module 800. Here, the reporting module 800 is shown as being associated with a dashboard interface that includes a representation or listing of retired assets 809, according to aspects of the disclosure. Oftentimes during analysis of cable systems and various cables included within the cable systems, assets may need to be retired in order to ensure the safe and effective operation of the assets. The retirement of the assets often comes with a set of data that can be tracked and analyzed to determine patterns and correlations between the types of cables used, the location of the cable systems, the conditions experienced, and the cable systems installed. Through the analysis of these correlations and patterns, the lifetime of the cable systems and cables thereof can be extended, or preventative measures can be taken based on a series of predictions in order to determine when replacement and subsequent retirement of the assets should take place.

In some examples, the reporting module 800 can include a list of retired assets 809 that are output as a report detailing a history of retired assets managed by the cable analysis system. The retired assets 809 can include identifiers of the assets, a location of the assets, a type of cables in the cable system, a reason for retirement, a total lifetime of the asset before retirement, approval of the retirement of the asset, and a date of retirement.

The data included in these reports can be provided as input to a machine learning algorithm in order to train the machine learning algorithm to generate a prediction, based on historical data including the conditions of operation, and the type of cables or cable systems performing the operation, in order to predict a life expectancy of effective operation. The machine training algorithm can continuously be trained with data based on location, alerts types received, and reasons for retirement of similar assets to predict and identify a time period where an asset is to be considered for retirement and subsequent replacement.

Based on this prediction, the cable analysis system 100 can generate an alert to a workgroup or the general dashboard to trigger remedial actions directed towards retirement and replacement of the cables, sensor systems, or the cable system. The prediction can further trigger the workgroup to be assigned tasks automatically by the cable analysis system that prompt members of the workgroup to further be assigned tasks in furtherance of maintenance or troubleshooting to extend the life of the asset, or prepare for retirement and replacement of the asset.

Figure 9:
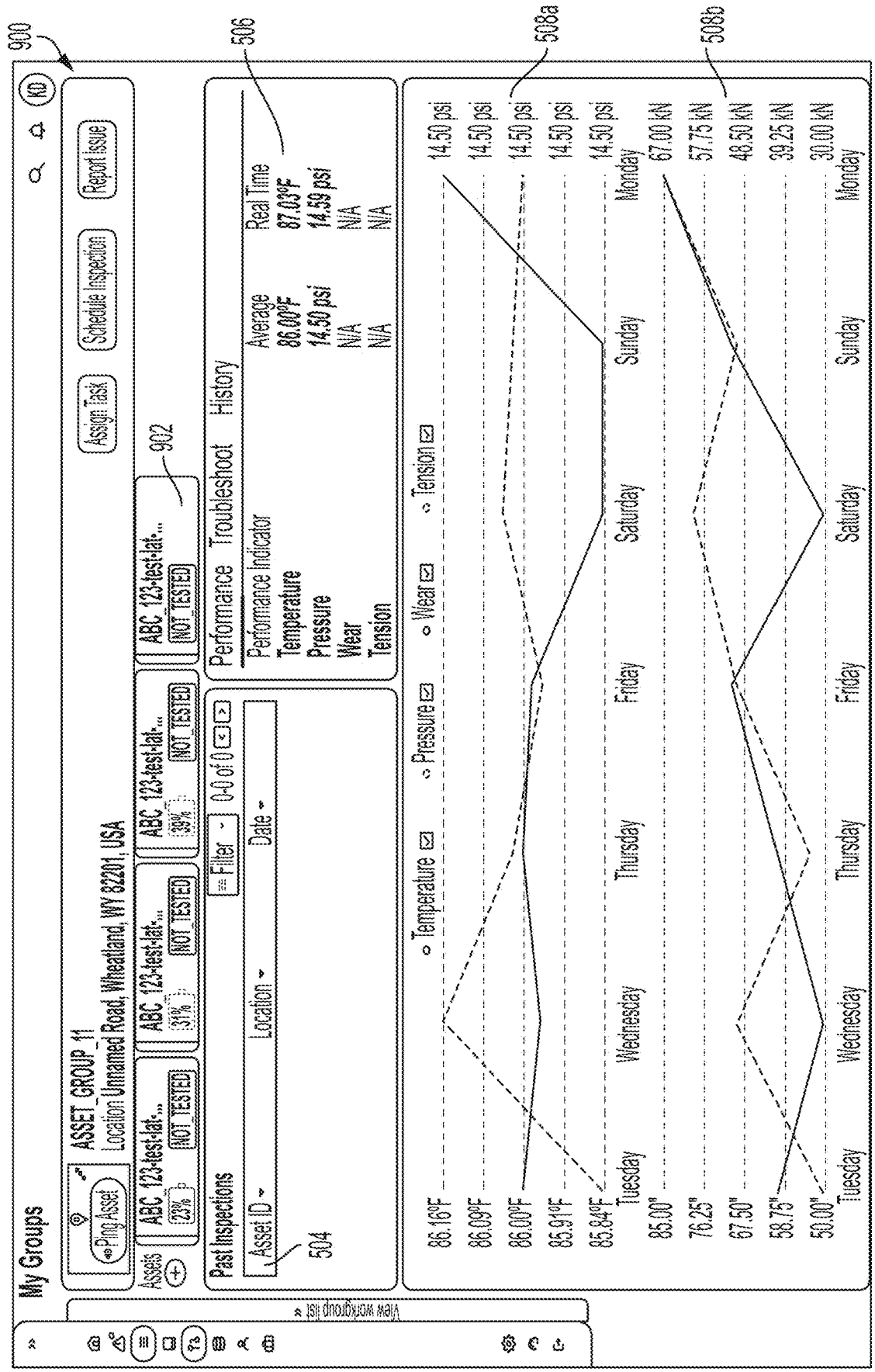
FIG. 9 illustrates a workgroup interface of the cable analysis system, according to aspects of the disclosure.

FIG. 9 illustrates a workgroup interface 900 of the cable analysis system 100, according to aspects of the disclosure.

The workgroup interface 900 can provide an output (e.g., to a workgroup or a member of a workgroup) indicative of a set of assigned assets 902 corresponding to the workgroup. The workgroup interface 900 can provide a user with the cable system status 506, the past inspections 504, and the first and second performance diagrams 508*a*-508*b*, of the set of assigned assets 902 in the workgroup. In some examples, a member of the workgroup can navigate between the various assets assigned in the workgroup in order to perform an evaluation of the various assets. Accordingly, the cable analysis system can automatically make suggestion of a priority order based on the location of the asset, the remedial action needed, or the status of the asset. As the workgroup is updated with new tasks manually, or automatically by the cable analysis system 100, the set of assigned assets 902 is dynamically updated along with the relevant data associated with the asset. Subsequently, upon the removal or retirement of an asset, the set of assigned assets 902 can be updated to reflect the change in the removed assets.

Figure 10:
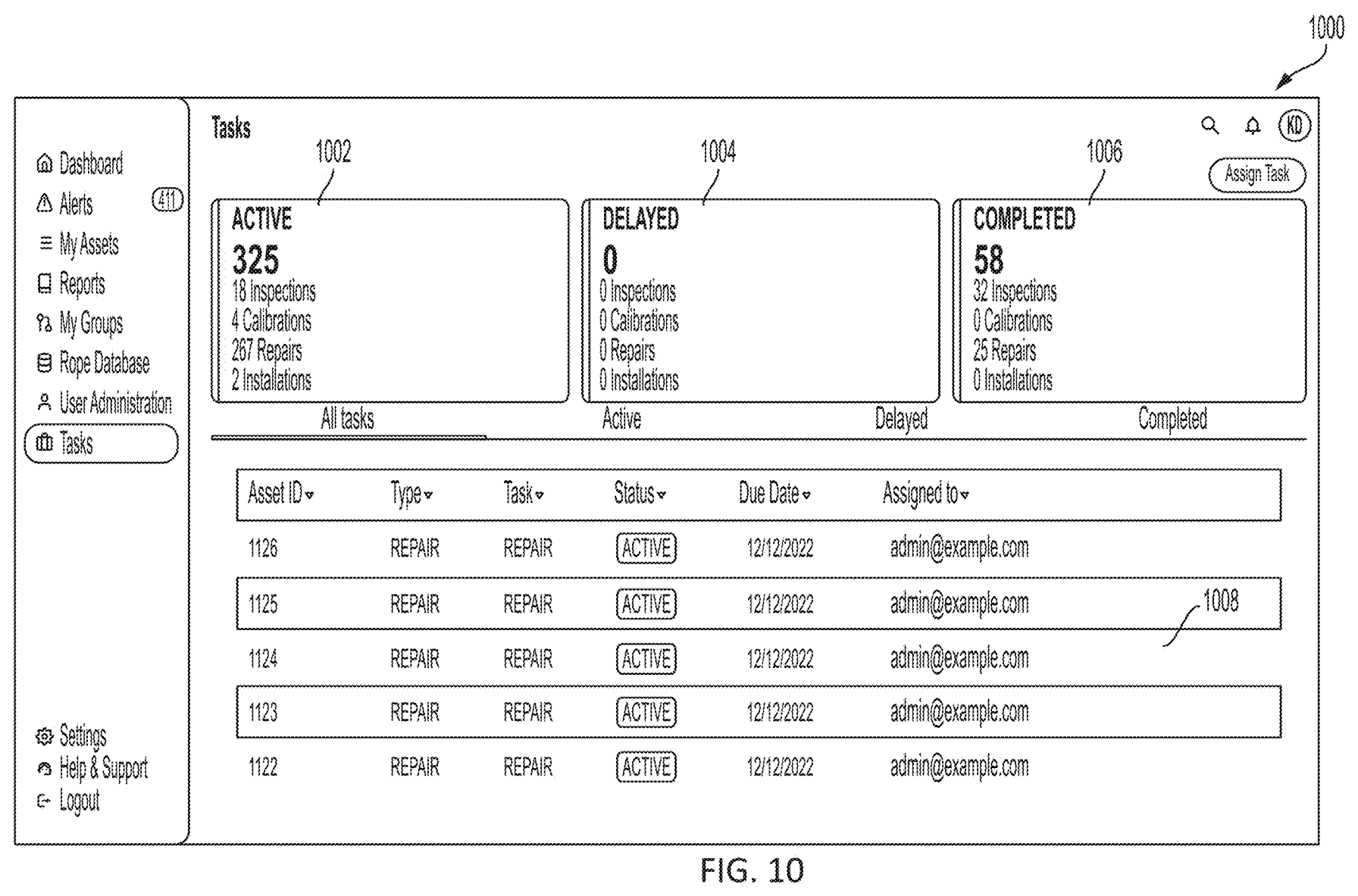

FIG. 10 illustrates a task interface 1000 of the cable analysis system 100, according to aspects of the disclosure. The task interface 1000 can provide an analysis of tasks assigned automatically by the cable analysis system 100 and/or tasks assigned manually by an administrative user of the cable analysis system 100. The task interface can output a various different task groups, including groups of active tasks 1002, delayed tasks 1004, and completed tasks 1006.

Each of the active tasks 1002, the delayed tasks 1004, and the completed tasks 1006 can include all of the corresponding tasks (e.g., of either the active, delayed, or completed status, respectively) that have been assigned to individual members or workgroups. Each of the task groups can provide an analysis of the tasks that are currently being inspected, calibrated, in need of repairs, and scheduled installations. Each of the task groups further can output a report on the status of each of the tasks included in the respective task group. For instance, the task status report can be provided via a tasks repository 1008. The tasks repository 1008 can be indicative of a current status of the task, including the asset identifier related to the task, the type of task to be completed, the specific task type, the status of the task, a due date for the task to be completed, and a workgroup or member the task is assigned to. In some examples, the cable analysis system 100 can automatically update the task groups based on the current status, or an expected completion date for each task currently assigned for each cable system monitored. As the status of tasks are updated per workgroup, tasks in each of the task groups can be updated to an active task 1002, delayed task 1004, or completed task 1006.

Figure 11:
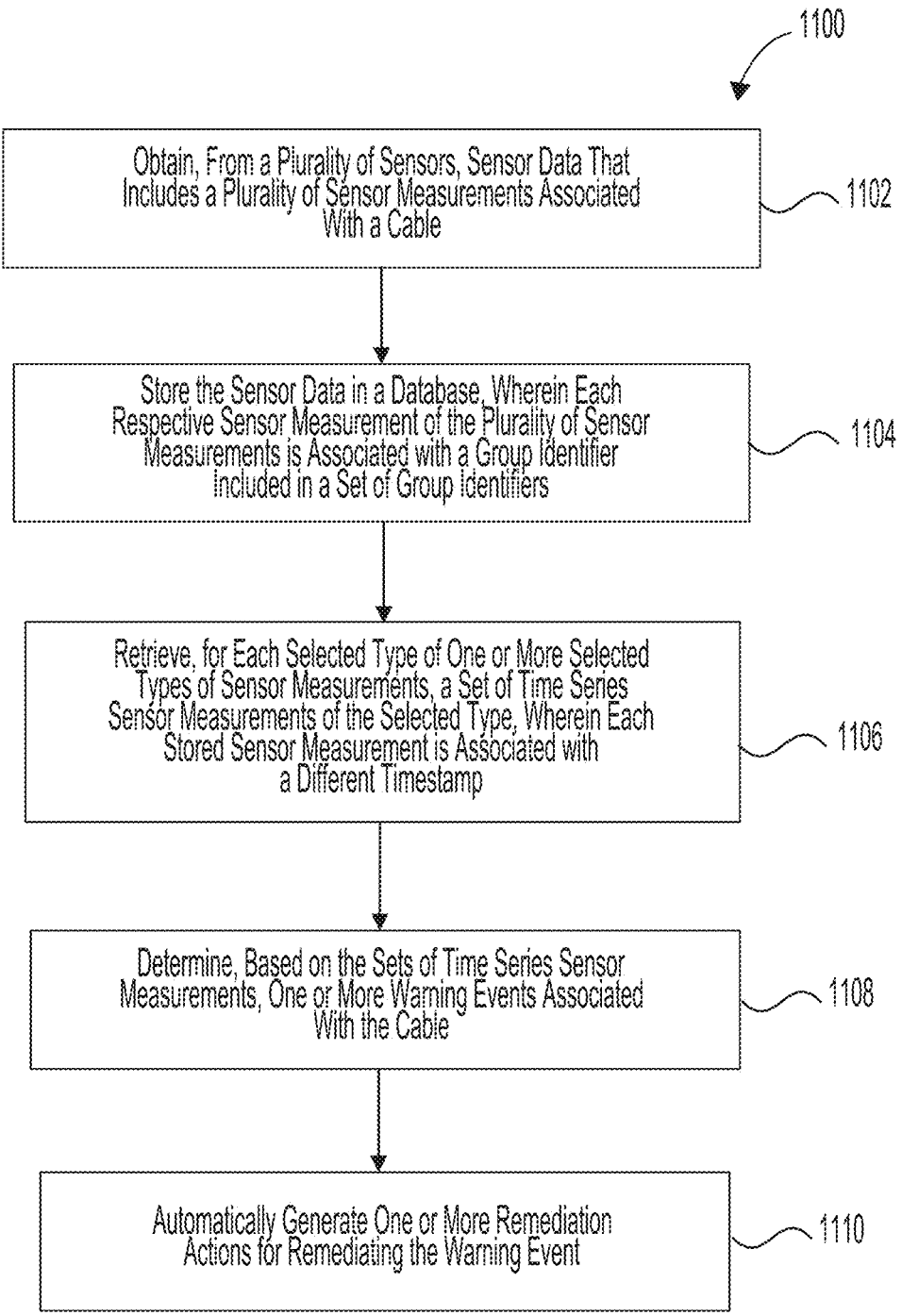
FIG. 11 illustrates an example method of the application for cable analysis, according to aspects of the disclosure.

FIG. 11 illustrates an example method 1100 for a cable system analysis service for analyzing, inspecting and monitoring cable systems including a plurality of cables. Although the example method 1100 depicts a particular sequence of operations, the sequence may be altered without departing from the scope of the present disclosure. For example, some of the operations depicted may be performed in parallel or in a different sequence that does not materially affect the function of the method 1100. In other examples, different components of an example device or system that implements the method 1100 may perform functions at substantially the same time or in a specific sequence.

According to some examples, at block 1102, the method 1100 includes obtaining from a plurality of sensors, sensor data that includes a plurality of sensor measurements associated with a cable. For example, the sensor module 108 illustrated in FIG. 1 may obtain from a plurality of sensors (sensor systems 110*a*-110*b* of FIG. 1) sensor data that includes a plurality of sensor measurements associated with a cable. In some examples, one or more sensor measurements of the plurality of sensor measurements are obtained using a non-contact sensor coupled to the cable or associated with a surrounding environment of the cable. In some examples, at least a portion of the sensor data is obtained as sensor measurements transmitted intermittently by an intermittent reporting sensor included in the plurality of sensors.

Further, the method 1100 can include obtaining from the plurality of sensors real-time sensor data that includes a plurality of real-time sensor measurements associated with the cable. For example, the internal computing system 112 illustrated in FIG. 1 may obtain from the plurality of sensors, in the sensor module 108 illustrated in FIG. 1, real-time sensor data that includes a plurality of real-time sensor measurements associated with the cable.

Further, the method 1100 can include receiving a user selection of a particular cable included in a plurality of cables represented in the database 104 in FIG. 1. For example, the internal computing system 112 of FIG. 1 may receive a user selection of a particular cable included in a plurality of cables represented in the database 104. In some examples, the set of stored sensor measurements of each selected type is retrieved based on correlating each user input to a corresponding group identifier used by the database. In some examples, the one or more selected types of sensor measurements are determined based on one or more user inputs received to a user interface.

Further, the method 1100 can include determining a plurality of available types of sensor measurements corresponding to the stored sensor measurements associated with the particular cable. For example, the internal computing system 112 illustrated in FIG. 1 may determine a plurality of available types of sensor measurements corresponding to the stored sensor measurements associated with the particular cable.

Further, the method 1100 can include obtaining the one or more selected types of sensor measurements as a user selection from the plurality of available types of sensor measurements for the particular cable. For example, the user interface service 122 illustrated in FIG. 1 may obtain the one or more selected types of sensor measurements as a user selection from the plurality of available types of sensor measurements for the particular cable.

Further, the method 1100 can include configuring the intermittent reporting sensor with one or more pre-determined reporting thresholds. For example, the instruction service 120 illustrated in FIG. 1 may configure the intermittent reporting sensor with one or more pre-determined reporting thresholds. In some examples, the intermittent reporting sensor remains in a low power mode and does not report collected sensor data that is below at least one of the pre-determined reporting thresholds. In some examples, the intermittent reporting sensor exits the low power mode and reports collected sensor that exceeds at least one of the pre-determined reporting thresholds.

According to some examples, at block 1104, the method 1100 includes storing the sensor data in a database. For example, the internal computing system 112 illustrated in FIG. 1 may store the sensor data in a database 104. In some examples, the sensor coupled to the cable comprises a fiber optic sensor.

In some examples, each sensor measurement of the first subset is obtained from a respective sensor associated with the cable. In some examples, at least one sensor measurement of the first subset is obtained using a sensor coupled to the cable. In some examples, the battery powered sensor include a transceiver for communicating with a receiver associated with the database.

In some examples, at least one sensor measurement of the first or second subset of sensor data is obtained using a battery powered sensor. In some examples, at least one sensor measurement of the second subset is obtained from a sensor associated with an asset deployed in the surrounding environment of the cable. In some examples, the second subset of sensor data includes environmental kinematic measurements or baseline movement information determined for the surrounding environment of the cable.

In some examples, each respective sensor measurement of the plurality of sensor measurements is associated with a group identifier included in a set of group identifiers. In some examples, a first subset of sensor data includes sensor measurements indicative of a physical property of the cable. In some examples, a second subset of sensor data that includes sensor measurements corresponding to the surrounding environment of the cable.

Further, the method 1100 can include performing motion compensation for the first subset of sensor data associated with the physical properties of the cable. For example, the analysis service 116 illustrated in FIG. 1 may perform motion compensation for the first subset of sensor data associated with the physical properties of the cable. In some examples, the motion compensation is performed based on the environmental kinematic measurements or baseline movement information associated with the surrounding environment of the cable. In some examples, performing the motion compensation comprises generating a refined version of the first subset of sensor data that removes the baseline movement information associated with the surrounding environment of the cable.

According to some examples, at block 1106, the method 1100 includes retrieving, for each selected type of one or more selected types of sensor measurements, a set of time series sensor measurements of the selected type. For example, the analysis service 116 illustrated in FIG. 1 may retrieve for each selected type of one or more selected types of sensor measurements a set of time series sensor measurements of the selected type. In some examples, the automatically generated workgroup is determined based on identifying one or more sensor measurements correlated with a given cable. In some examples, the automatically generated workgroup includes one or more selected types of sensor measurements. In some examples, each stored sensor measurement is associated with a different timestamp. In some examples, one or more selected types of sensor measurements are obtained based on an automatically generated workgroup of related cables and sensors. In some examples, one or more selected types of sensor measurements are associated with the cable or are associated with a workgroup that includes the cable and one or more physical assets different than the cable.

According to some examples, the workgroups can be generated based on a plurality of common features of each cable in the cabling system. The common features can include features including physical characteristics, materials, or manufacturers. The creation of the workgroups can permit the user to analyze the broader behavior of the cables and the associated cabling system or to teach a machine learning model using artificial intelligence (AI) to identify additional global patterns.

According to some examples, at block 1108, the method 1100 includes determining based on the sets associated with the cable. For example, the analysis service 116 illustrated in FIG. 1 may determine, based on the sets of time series sensor measurements, one or more warning events associated with the cable.

Further, the method 1100 can include determining one or more baseline fluctuations associated with one or more of the sets of time series sensor measurements. For example, the analysis service 116 illustrated in FIG. 1 may determine one or more baseline fluctuations associated with one or more of the sets of time series sensor measurements.

Further, the method 1100 can include analyzing a most recent portion of the sets of time series sensor measurements against the one or more determined baseline fluctuations and one or more thresholds. For example, the analysis service 116 illustrated in FIG. 1 may analyze a most recent portion of the sets of time series sensor measurements against the one or more determined baseline fluctuations and one or more thresholds. In some examples, the one or more thresholds comprise pre-determined thresholds determined based on one or user inputs. In some examples, the one or more thresholds are determined based on analyzing the sets of time series sensor measurements against one or more corresponding sets of ground truth labeled data.

Further, the method 1100 can include determining based on the sets of time series sensor measurements and the real-time sensor data one or more ongoing warning events associated with the cable. For example, the analysis service 116 illustrated in FIG. 1 may determine based on the sets of time series sensor measurements and the real-time sensor data one or more ongoing warning events associated with the cable.

For example, the internal computing system 112 illustrated in FIG. 1 may generate a set of ground truth labeled data based on obtaining historical outcome data associated with one or more reference cables. For example, the communication service 118 illustrated in FIG. 1 may obtain historical outcome data associated with one or more reference cables.

Further, the internal computing system 112 illustrated in FIG. 1 may generate a set of ground truth labeled data based on obtaining reference measurements associated with the one or more reference cables. For example, the communication service 118 illustrated in FIG. 1 may obtain reference measurements associated with the one or more reference cables.

Further, the internal computing system 112 illustrated in FIG. 1 may generate a set of ground truth labeled data based on generating one or more ground truth labels based on correlating a historical outcome of the historical outcome data with one or more features of the reference measurements. For example, the internal computing system 112 illustrated in FIG. 1 may generate one or more ground truth labels based on correlating a historical outcome of the historical outcome data with one or more features of the reference measurements.

Further, the method 1100 can include generating a warning event based on identifying one or more deviations or abnormalities in the analysis of the most recent portion of the sets of time series sensor measurements. For example, the internal computing system 112 illustrated in FIG. 1 may generate a warning event based on identifying one or more deviations or abnormalities in the analysis of the most recent portion of the sets of time series sensor measurements.

According to some examples, at block 1110, the method 1100 includes automatically generating one or more remediation actions for remediating the warning event at block 410. For example, the analysis service 116 illustrated in FIG.

1 may generate one or more remediation action in response to the determining of the warnings events associated with the cable.

Figure 12:
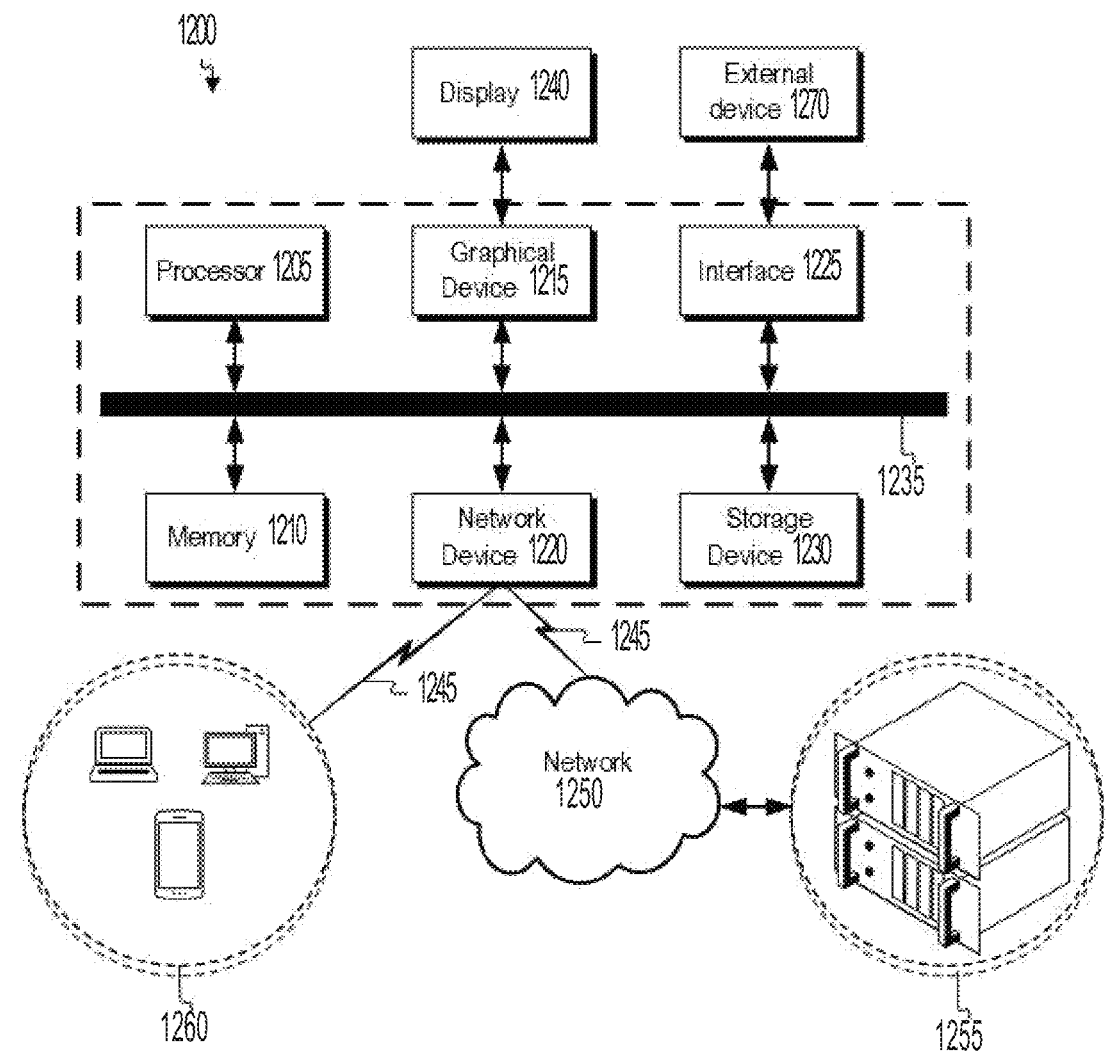
FIG. 12 illustrates an example computer system for executing a client application according to aspects of the disclosure.

FIG. 12 illustrates an example computer system 1200 for implementing aspects of the instant disclosure. For example, the example computer system 1200 may execute a client application for performing aspects of the instant disclosure.

The example computer system 1200 includes a processor 1205, a memory 1210, a graphical device 1215, a network device 1220, interface 1225, and a storage device 1230 that are connected to operate via a bus 1235. The processor 1205 reads causes machine instructions (e.g., reduced instruction set (RISC), complex instruction set (CISC), etc.) that are loaded into the memory 1210 via a bootstrapping process and executes an operating system (OS) for executing application within frameworks provided by the OS. For example, the processor 1205 may execute an application that executes an application provided by a graphical framework such as Winforms, Windows Presentation Foundation (WPF), Windows User Interface (WinUI), or a cross platform user interface such as Xamarin or QT. In other examples, the processor 1205 may execute an application that is written for a sandbox environment such as a web browser.

The processor 1205 controls the memory 1210 to store instructions, user data, OS content, and other content that cannot be stored within the processor 1205 internally (e.g., within the various caches). The processor 1205 may also control a graphical device 1215 (e.g., a graphical processor) that outputs graphical content to a display 1240. In some example, the graphical device 1215 may be integral within the processor 1205. In yet another example, the display 1240 may be integral with the computer system 1200 (e.g., a laptop, a tablet, a phone, etc.).

The graphical device 1215 may be optimized to perform floating point operations such as graphical computations, and may be configured to execute other operations in place of the processor 1205. For example, controlled by instructions to perform mathematical operations optimized for floating point math. For example, the processor 1205 may allocate instructions to the graphical device 1215 for operations that are optimized for the graphical device 1215. For instance, the graphical device 1215 may execute operations related to artificial intelligence (AI), natural language processing (NLP), vector math. The results may be returned to the processor 1205. In another example, the application executing in the processor 1205 may provide instructions to cause the processor 1205 to request the graphical device 1215 to perform the operations. In other examples, the graphical device 1215 may return the processing results to another computer system (i.e., distributed computing).

The processor 1205 may also control a network device 1220 for transmits and receives data using a plurality of wireless channels 1245 and at least one communication standard (e.g., Wi-Fi (i.e., 802.11ax, 802.11e, etc.), Bluetooth®, various standards provided by the 3rd Generation Partnership Project (e.g., 3G, 4G, 5G), or a satellite communication network (e.g., Starlink). The network device 1220 may wirelessly connect to a network 1250 to connect to servers 1255 or other service providers. The network device 1220 may also be connected to the network 1250 via a physical (i.e., circuit) connection. The network device 1220 may also directly connect to local electronic device 1260 using a point-to-point (P2P) or a short range radio connection.

The processor 1205 may also control an interface 1225 that connects with an external device 1270 for bidirectional or unidirectional communication. The interface 1225 is any suitable interface that forms a circuit connection and can be implemented by any suitable interface (e.g., universal serial bus (USB), Thunderbolt, and so forth). The external device 1265 is able to receive data from the interface 1225 to process the data or perform functions for different applications executing in the processor 1205. For example, the external device 1265 may be another display device, a musical instrument, a computer interface device (e.g., a keyboard, a mouse, etc.), an audio device (e.g., an analog-to-digital converter (ADC), a digital-to-analog converter (DAC)), a storage device for storing content, an authentication device, an external network interface (e.g., a 5G hotspot), a printer, and so forth.

Figure 13:
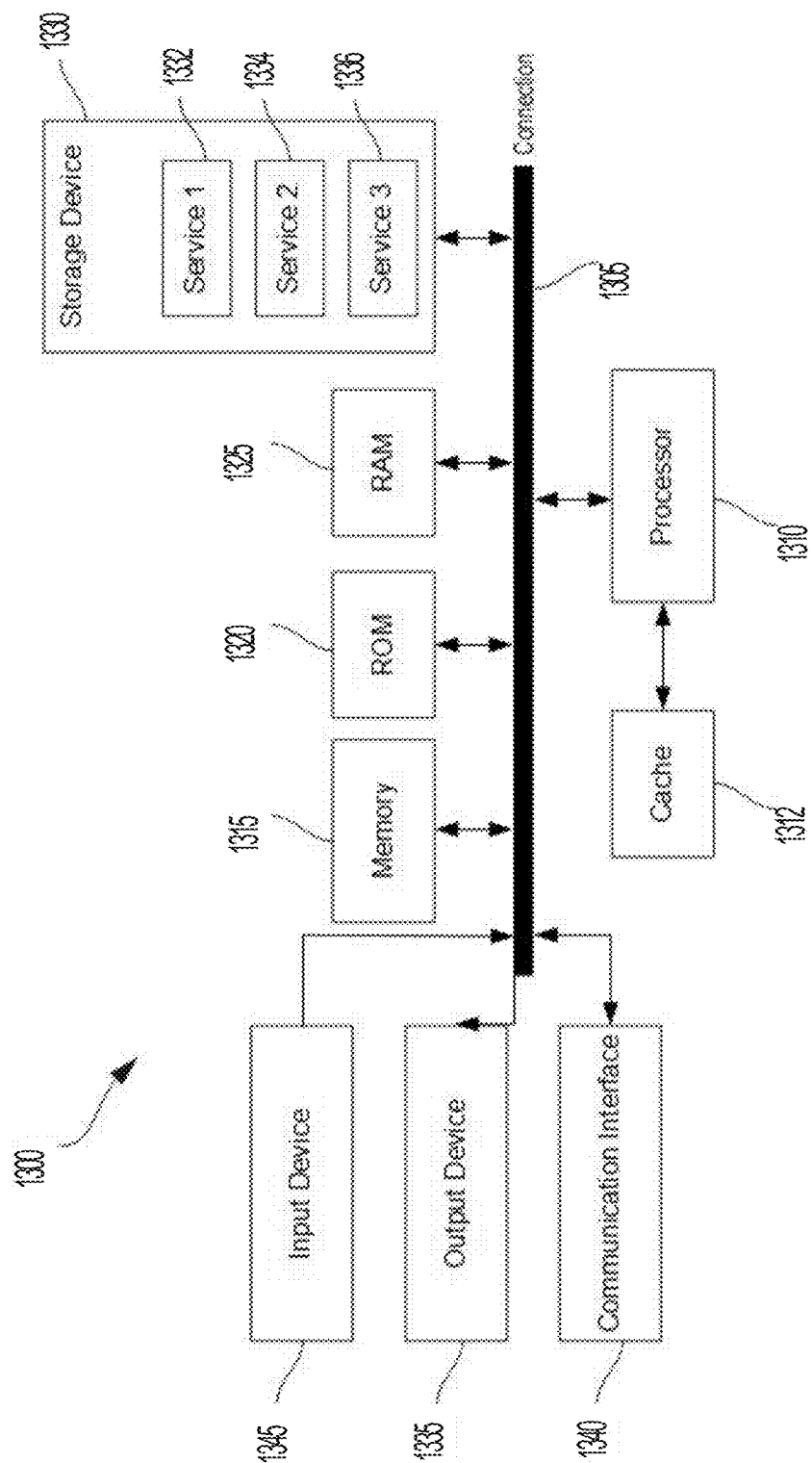
FIG. 13 is a block diagram illustrating an example of a computing system, according to aspects of the disclosure.

FIG. 13 is a diagram illustrating an example of a system for implementing certain aspects of the present technology. In particular, FIG. 13 illustrates an example of computing system 1300, which can be for example any computing device making up internal computing system, a remote computing system, a camera, or any component thereof in which the components of the system are in communication with each other using connection 1305. Connection 1305 can be a physical connection via a bus, or a direct connection into processor 1310, such as in a chipset architecture. Connection 1305 can also be a virtual connection, networked connection, or logical connection.

In some embodiments, computing system 1300 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1300 includes at least one processing unit (CPU or processor) 1310 and connection 1305 that couples various system components including system memory 1315, such as read-only memory (ROM) 1320 and random access memory (RAM) 1325 to processor 1310. Computing system 1300 can include a cache of high-speed memory 1312 connected directly with, in close proximity to, or integrated as part of processor 1310.

Processor 1310 can include any general purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which can represent any number of input mechanisms, such as a microphone for speech, a touch-sensitive screen for gesture or graphical input, keyboard, mouse, motion input, speech, etc. Computing system 1300 can also include output device 1335, which can be one or more of a number of output mechanisms known to those of skill in the art. In some instances, multimodal systems can enable a user to provide multiple types of input/output to communicate with computing system 1300. Computing system 1300 can include communications interface 1340, which can generally govern and manage the user input and system output. There is no restriction on operating on any particular hardware arrangement, and therefore the basic features here may easily be substituted for improved hardware or firmware arrangements as they are developed.

Computing system 1300 can include communications interface 1340, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 can include software services, servers, services, etc., that when the code that defines such software is executed by the processor 1310, it causes the system to perform a function. In some embodiments, a hardware service that performs a particular function can include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Specific details are provided in the description above to provide a thorough understanding of the embodiments and examples provided herein, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some embodiments the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than (XX) and greater than (XX) symbols or terminology used herein can be replaced with less than or equal to ($\leq$) and greater than or equal to ($\geq$) symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Aspects of the present disclosure include:

Aspect 1. A method comprising: obtaining, from a plurality of sensors, sensor data that includes a plurality of sensor measurements associated with a synthetic fiber cable; storing the sensor data in a database, wherein each respective sensor measurement of the plurality of sensor measurements is associated with a group identifier included in a set of group identifiers; retrieving, for each selected type of one or more selected types of sensor measurements, a set of time series sensor measurements of the selected type, wherein each stored sensor measurement is associated with a different timestamp; determining, based on the sets of time series sensor measurements, one or more warning events associated with the synthetic fiber cable; and automatically generating one or more remediation actions for remediating the warning event.

Aspect 2. The method of Aspect 1, wherein determining one or more warning events associated with the synthetic fiber cable includes: determining one or more baseline fluctuations associated with one or more of the sets of time series sensor measurements; analyzing a most recent portion of the sets of time series sensor measurements against the one or more determined baseline fluctuations and one or more thresholds; and generating a warning event based on identifying one or more deviations or abnormalities in the analysis of the most recent portion of the sets of time series sensor measurements.

Aspect 3. The method of Aspect 2, wherein: the one or more thresholds comprise pre-determined thresholds determined based on one or user inputs; or the one or more thresholds are determined based on analyzing the sets of time series sensor measurements against one or more corresponding sets of ground truth labeled data.

Aspect 4. The method of Aspect 3, further comprising generating a set of ground truth labeled data based on: obtaining historical outcome data associated with one or more reference cables; obtaining reference measurements associated with the one or more reference cables; and generating one or more ground truth labels based on correlating a historical outcome of the historical outcome data with one or more features of the reference measurements.

Aspect 5. The method of any of Aspects 1 to 4, further comprising: obtaining, from the plurality of sensors, real-time sensor data that includes a plurality of real-time sensor measurements associated with the synthetic fiber cable; determining, based on the sets of time series sensor measurements and the real-time sensor data, one or more ongoing warning events associated with the synthetic fiber cable; and automatically generating one or more alerts indicative of the one or more ongoing warning events associated with the synthetic fiber cable.

Aspect 6. The method of any of Aspects 1 to 5, wherein the one or more selected types of sensor measurements are obtained based on: receiving a user selection of a particular cable included in a plurality of cables represented in the database; determining a plurality of available types of sensor measurements corresponding to the stored sensor measurements associated with the particular cable; obtaining the one or more selected types of sensor measurements as a user selection from the plurality of available types of sensor measurements for the particular cable.

Aspect 7. The method of any of Aspects 1 to 6, wherein: the one or more selected types of sensor measurements are determined based on one or more user inputs received to a user interface; and the set of stored sensor measurements of each selected type are retrieved based on correlating each user input to a corresponding group identifier used by the database.

Aspect 8. The method of any of Aspects 1 to 7, wherein: the one or more selected types of sensor measurements are obtained based on an automatically generated workgroup of related cables and sensors, wherein the automatically generated workgroup includes the one or more selected types of sensor measurements; and the automatically generated workgroup is determined based on identifying one or more types of sensor measurements that are correlated with a given cable.

Aspect 9. The method of any of Aspects 1 to 8, wherein the one or more selected types of sensor measurements are associated with the synthetic fiber cable or are associated with a workgroup that includes the synthetic fiber cable and one or more physical assets different than the synthetic fiber cable.

Aspect 10. The method of any of Aspects 1 to 9, wherein the sensor data comprises: a first subset of sensor data that includes sensor measurements indicative of a physical property of the synthetic fiber cable, wherein each sensor measurement of the first subset is obtained from a respective sensor associated with the synthetic fiber cable; and a second subset of sensor data that includes sensor measurements corresponding to a surrounding environment of the synthetic fiber cable.

Aspect 11. The method of any of Aspects 1 to 10, wherein at least one sensor measurement of the first subset is obtained using a sensor coupled to the synthetic fiber cable.

Aspect 12. The method of any of Aspects 1 to 11, wherein the sensor coupled to the synthetic fiber cable comprises a fiber optic sensor.

Aspect 13. The method of any of Aspects 1 to 12, wherein at least one sensor measurement of the first or second subset of sensor data is obtained using a battery powered sensor, the battery powered sensor include a transceiver for communicating with a receiver associated with the database.

Aspect 14. The method of any of Aspects 1 to 13, wherein at least one sensor measurement of the second subset is obtained from a sensor associated with an asset deployed in the surrounding environment of the synthetic fiber cable.

Aspect 15. The method of any of Aspects 1 to 14, wherein the second subset of sensor data includes environmental kinematic measurements or baseline movement information determined for the surrounding environment of the synthetic fiber cable.

Aspect 16. The method of any of Aspects 1 to 15, further comprising: performing motion compensation for the first subset of sensor data associated with physical properties of the synthetic fiber cable; and wherein the motion compensation is performed based on the environmental kinematic measurements or baseline movement information associated with the surrounding environment of the synthetic fiber cable.

Aspect 17. The method of any of Aspects 1 to 16, wherein performing the motion compensation comprises generating a refined version of the first subset of sensor data that removes the baseline movement information associated with the surrounding environment of the synthetic fiber cable.

Aspect 18. The method of any of Aspects 1 to 17, wherein one or more sensor measurements of the plurality of sensor measurements are obtained using a non-contact sensor coupled to the synthetic fiber cable or associated with a surrounding environment of the synthetic fiber cable.

Aspect 19. The method of any of Aspects 1 to 18, wherein at least a portion of the sensor data is obtained as sensor measurements transmitted intermittently by an intermittent reporting sensor included in the plurality of sensors.

Aspect 20. The method of any of Aspects 1 to 19, further comprising configuring the intermittent reporting sensor with one or more pre-determined reporting thresholds, wherein: the intermittent reporting sensor remains in a low power mode and does not report collected sensor data that is below at least one of the pre-determined reporting thresholds; and the intermittent reporting sensor exits the low power mode and reports collected sensor that exceeds at least one of the pre-determined reporting thresholds.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein can be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter can have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
   obtaining, from a plurality of sensors, sensor data that includes a plurality of sensor measurements associated with a synthetic fiber cable;
   storing the sensor data in a database, wherein each respective sensor measurement of the plurality of sensor measurements is associated with a group identifier included in a set of group identifiers;
   retrieving, for each selected type of one or more selected types of sensor measurements, a set of time series sensor measurements of the selected type, wherein each stored sensor measurement is associated with a different timestamp;
   determining, based on the sets of time series sensor measurements, one or more warning events associated with the synthetic fiber cable; and
   automatically generating one or more remediation actions for remediating the warning event.

2. The method of claim 1, wherein determining one or more warning events associated with the synthetic fiber cable includes:
   determining one or more baseline fluctuations associated with one or more of the sets of time series sensor measurements;
   analyzing a most recent portion of the sets of time series sensor measurements against the one or more determined baseline fluctuations and one or more thresholds; and
   generating a warning event based on identifying one or more deviations or abnormalities in an analysis of the most recent portion of the sets of time series sensor measurements.

3. The method of claim 2, wherein:
   the one or more thresholds comprise pre-determined thresholds determined based on one or user inputs; or
   the one or more thresholds are determined based on analyzing the sets of time series sensor measurements against one or more corresponding sets of ground truth labeled data.

4. The method of claim 3, further comprising generating a set of ground truth labeled data based on:
   obtaining historical outcome data associated with one or more reference cables;
   obtaining reference measurements associated with the one or more reference cables; and
   generating one or more ground truth labels based on correlating a historical outcome of the historical outcome data with one or more features of the reference measurements.

5. The method of claim 1, further comprising:
   obtaining, from the plurality of sensors, real-time sensor data that includes a plurality of real-time sensor measurements associated with the synthetic fiber cable;
   determining, based on the sets of time series sensor measurements and the real-time sensor data, one or more ongoing warning events associated with the synthetic fiber cable; and
   automatically generating one or more alerts indicative of the one or more ongoing warning events associated with the synthetic fiber cable.

6. The method of claim 1, wherein the one or more selected types of sensor measurements are obtained based on:
   receiving a user selection of a particular cable included in a plurality of cables represented in the database;
   determining a plurality of available types of sensor measurements corresponding to the stored sensor measurements associated with the particular cable; and
   obtaining the one or more selected types of sensor measurements as a user selection from the plurality of available types of sensor measurements for the particular cable.

7. The method of claim 1, wherein:
   the one or more selected types of sensor measurements are determined based on one or more user inputs received to a user interface; and
   the set of stored sensor measurements of each selected type are retrieved based on correlating each user input to a corresponding group identifier used by the database.

8. The method of claim 1, wherein:
   the one or more selected types of sensor measurements are obtained based on an automatically generated workgroup of related cables and sensors, wherein the automatically generated workgroup includes the one or more selected types of sensor measurements; and
   the automatically generated workgroup is determined based on identifying one or more types of sensor measurements that are correlated with a given cable.

9. The method of claim 1, wherein the one or more selected types of sensor measurements are associated with the synthetic fiber cable or are associated with a workgroup that includes the synthetic fiber cable and one or more physical assets different than the synthetic fiber cable.

10. The method of claim 1, wherein the sensor data comprises:
    a first subset of sensor data that includes sensor measurements indicative of a physical property of the synthetic fiber cable, wherein each sensor measurement of the first subset is obtained from a respective sensor associated with the synthetic fiber cable; and
    a second subset of sensor data that includes sensor measurements corresponding to a surrounding environment of the synthetic fiber cable.

11. The method of claim 10, wherein at least one sensor measurement of the first subset is obtained using a sensor coupled to the synthetic fiber cable.

12. The method of claim 11, wherein the sensor coupled to the synthetic fiber cable comprises a fiber optic sensor.

13. The method of claim 10, wherein at least one sensor measurement of the first or second subset of sensor data is obtained using a battery powered sensor, the battery powered sensor including a transceiver for communicating with a receiver associated with the database.

14. The method of claim 10, wherein at least one sensor measurement of the second subset is obtained from a sensor associated with an asset deployed in the surrounding environment of the synthetic fiber cable.

15. The method of claim 10, wherein the second subset of sensor data includes environmental kinematic measurements or baseline movement information determined for the surrounding environment of the synthetic fiber cable.

16. The method of claim 15, further comprising:
    performing motion compensation for the first subset of sensor data associated with physical properties of the synthetic fiber cable;
    wherein the motion compensation is performed based on the environmental kinematic measurements or baseline movement information associated with the surrounding environment of the synthetic fiber cable.

17. The method of claim 16, wherein performing the motion compensation comprises generating a refined version of the first subset of sensor data that removes the baseline movement information associated with the surrounding environment of the synthetic fiber cable.

18. The method of claim 1, wherein one or more sensor measurements of the plurality of sensor measurements are obtained using a non-contact sensor coupled to the synthetic fiber cable or associated with a surrounding environment of the synthetic fiber cable.

19. The method of claim 1, wherein at least a portion of the sensor data is obtained as sensor measurements transmitted intermittently by an intermittent reporting sensor included in the plurality of sensors.

20. The method of claim 19, further comprising configuring the intermittent reporting sensor with one or more pre-determined reporting thresholds, wherein:
the intermittent reporting sensor remains in a low power mode and does not report collected sensor data that is below at least one of the pre-determined reporting thresholds; and
the intermittent reporting sensor exits the low power mode and reports collected sensor that exceeds at least one of the pre-determined reporting thresholds.

* * * * *